(12) United States Patent
Achten et al.

(10) Patent No.: US 10,946,569 B2
(45) Date of Patent: Mar. 16, 2021

(54) METHOD FOR PRODUCING A FOAM BODY HAVING AN INTERNAL STRUCTURE

(71) Applicant: Covestro Deutschland AG, Leverkusen (DE)

(72) Inventors: Dirk Achten, Leverkusen (DE); Rebecca Alina Heil, Düsseldorf (DE); Rolf Albach, Cologne (DE); Michael Ehlers, Krefeld (DE); Dorothee Clasen, Cologne (DE); Sascha Praet, Cologne (DE); Adam Pajonk, Münster (DE)

(73) Assignee: Covestro Deutschiand AG, Leverkusen (DE)

( * ) Notice: Subject to any disclaimer, the term of this patent is extended or adjusted under 35 U.S.C. 154(b) by 19 days.

(21) Appl. No.: 16/341,510

(22) PCT Filed: Apr. 21, 2017

(86) PCT No.: PCT/EP2017/059526
§ 371 (c)(1),
(2) Date: Apr. 12, 2019

(87) PCT Pub. No.: WO2018/072891
PCT Pub. Date: Apr. 26, 2018

(65) Prior Publication Data
US 2019/0299505 A1    Oct. 3, 2019

(30) Foreign Application Priority Data

Oct. 18, 2016    (EP) .................................... 16194265

(51) Int. Cl.
B29C 45/14    (2006.01)
B29C 44/56    (2006.01)
(Continued)

(52) U.S. Cl.
CPC .... B29C 45/14795 (2013.01); B29C 44/5618 (2013.01); B29C 45/0001 (2013.01);
(Continued)

(58) Field of Classification Search
None
See application file for complete search history.

(56) References Cited

U.S. PATENT DOCUMENTS 5,158,922 A    10/1992  Hinney et al.
6,017,407 A *  1/2000  Yates ...................... B29C 44/04
                                                          156/145
(Continued)

FOREIGN PATENT DOCUMENTS

DE    202010014376 U1    10/2011
DE    102015100816 B3    12/2015
(Continued)

OTHER PUBLICATIONS

International Search Report for PCT/EP2017/059526 dated May 22, 2017.
(Continued)

*Primary Examiner* — Edmund H Lee
(74) *Attorney, Agent, or Firm* — Jed C. Benson

(57) ABSTRACT

A method for producing a foam body (10) having an internal structure (100, 200, 300), comprising the steps: I) selecting an internal structure (100, 200, 300) to be formed in the foam body (10), the structure comprising a first polymer material; II) providing a foam body (10), the foam body (10) comprising a second polymer material which is different to the first polymer material; III) injecting, by means of an injection means (20), a predefined amount of a melt of the first polymer material or a predefined amount of a reaction mixture (30, 31, 32) which reacts to form the first polymer material at a predefined location inside the foam body (10), (Continued)

corresponding to a volume element of the internal structure (100, 200, 300); IV) repeating step III) for further predefined locations inside the foam body (10), corresponding to further volume elements of the internal structure (10), until the internal structure (10) is formed. The invention also relates to a foam body (10) which has an internal structure (100, 200, 300) and is obtainable by the method according to the invention.

14 Claims, 16 Drawing Sheets

(51) Int. Cl.

| | | |
|---|---|---|
| *B29C 45/00* | (2006.01) | |
| *C08J 9/40* | (2006.01) | |
| *C08J 9/36* | (2006.01) | |
| *B29C 70/88* | (2006.01) | |
| *A47C 27/20* | (2006.01) | |
| *B29K 75/00* | (2006.01) | |
| *B29L 31/00* | (2006.01) | |
| *B29K 67/00* | (2006.01) | |
| *B29K 77/00* | (2006.01) | |
| *B29K 55/02* | (2006.01) | |
| *B29K 23/00* | (2006.01) | |
| *B29K 33/00* | (2006.01) | |
| *B29K 25/00* | (2006.01) | |
| *B29K 33/04* | (2006.01) | |
| *B29K 27/06* | (2006.01) | |
| *B29K 71/00* | (2006.01) | |

(52) U.S. Cl.
CPC .............. *B29C 70/887* (2013.01); *C08J 9/36* (2013.01); *C08J 9/405* (2013.01); *A47C 27/20* (2013.01); *B29C 2045/14803* (2013.01); *B29C 2045/14975* (2013.01); *B29K 2023/06* (2013.01); *B29K 2023/12* (2013.01); *B29K 2025/06* (2013.01); *B29K 2027/06* (2013.01); *B29K 2033/04* (2013.01); *B29K 2033/12* (2013.01); *B29K 2055/02* (2013.01); *B29K 2067/003* (2013.01); *B29K 2067/046* (2013.01); *B29K 2071/00* (2013.01); *B29K 2075/00* (2013.01); *B29K 2077/00* (2013.01); *B29K 2995/007* (2013.01); *B29K 2995/0063* (2013.01); *B29K 2995/0077* (2013.01); *B29L 2031/751* (2013.01); *C08J 2205/06* (2013.01); *C08J 2207/00* (2013.01); *C08J 2207/10* (2013.01); *C08J 2375/04* (2013.01); *C08J 2375/08* (2013.01); *C08J 2475/04* (2013.01)

(56) References Cited

U.S. PATENT DOCUMENTS

| | | | |
|---|---|---|---|
| 9,937,692 B2 | 4/2018 | Weimer et al. | |
| 2006/0083912 A1* | 4/2006 | Park ................. | A43B 7/08 |
| | | | 428/304.4 |

FOREIGN PATENT DOCUMENTS

| | | | | |
|---|---|---|---|---|
| EP | 0654302 A1 | 5/1995 | | |
| EP | 2886302 A2 | 6/2015 | | |
| EP | 2930009 A2 | 10/2015 | | |
| JP | 58099531 | * | 6/1983 | |
| WO | WO-8701775 A1 | 3/1987 | | |
| WO | WO-03020504 A1 | 3/2003 | | |
| WO | WO-2005063864 A1 * | 7/2005 | ............ | B29C 44/06 |
| WO | WO-2012148915 A2 | 11/2012 | | |
| WO | WO-2015066528 A1 | 5/2015 | | |

OTHER PUBLICATIONS

Written Opinion of the International Searching Authority for PCT/EP2017/059526 dated May 22, 2017.

* cited by examiner

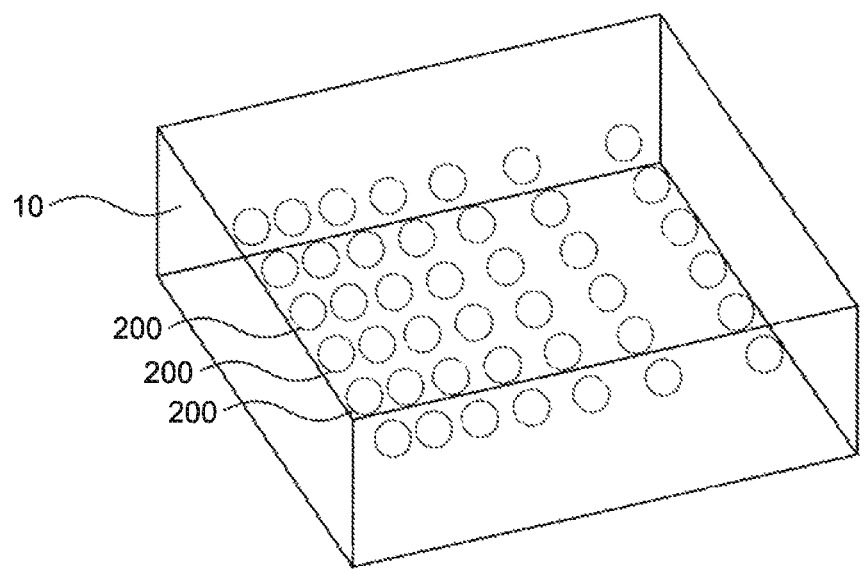
FIG. 7
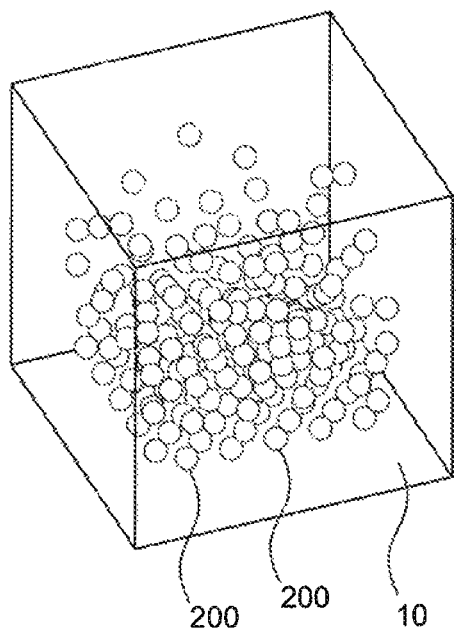 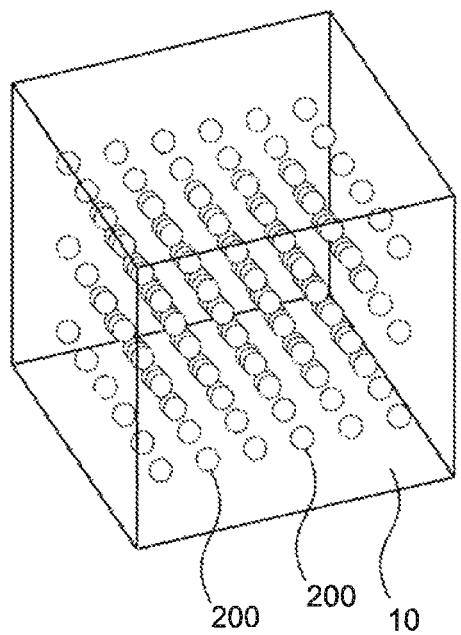
FIG. 8a　　　　　　　　FIG. 8b

METHOD FOR PRODUCING A FOAM BODY HAVING AN INTERNAL STRUCTURE

CROSS-REFERENCE TO RELATED APPLICATIONS

This application is a national stage application (under 35 U.S.C. § 371) of PCT/EP2017/059526, filed Apr. 21, 2017, which claims benefit of European Application No. 16194265.1, filed Oct. 18, 2016, both of which are incorporated herein by reference in their entirety.

The present invention relates to a process for producing a foam body having an internal structure, comprising injection by means of an injection means of a predetermined amount of a melt of a polymeric material or a predetermined amount of a reaction mixture which reacts to afford a polymeric material into a predetermined location of a foam body which corresponds to a volume element of the internal structure. The invention likewise relates to a foam body having an internal structure obtainable by the process according to the invention.

The modification of foams by introduction of other materials into the foam is known per se. The modification may be for example a repair, a mechanical reinforcement, an altering of damping characteristics or an improvement in combustion behavior.

DE 20 2010 014376 UI is concerned with plastics sandwich material technology and has for its object to provide a composite material and an arrangement with the composite material with which a light and stable support structure is achieved. Disclosed is a composite material having a three-dimensional sponge structure, in particular a sponge material or sponge-like material, and a connecting material which binds and/or stabilizes the sponge structure. The connecting material may be or comprise a plastics material, in particular a resin material, in particular polyester resin or epoxy resin.

WO 2012/148915 A2 relates to the field of cushioning materials and discloses a cushioning element comprising a breathable porous foam comprising an array of interconnected cell walls, thus defining an open-pored network, and comprising an elastomeric material which is formed over at least a portion of the interconnected cell walls. The elastomeric material comprises an elastomeric polymer and a plasticizer, wherein a weight ratio of plasticizer to elastomeric polymer is 0.1 to 50. The breathable porous foam is adapted to allow gases passage through at least one portion of the open-pored network adjacent to the elastomeric material.

WO 03/020504 A1 describes a process for producing a polyolefin-infused porous material, comprising: (a) mixing an olefin monomer resin formulation with a metathesis catalyst to obtain a catalyzed resin formulation; (b) infusing the mixture into a porous material, wherein the porous material is selected from the group consisting of wood, cement, concrete, open-celled and reticulated foams and sponges, papers, cardboards, felts, ropes or braids of natural or synthetic fibers and sintered materials; the mixture penetrates the pores of the porous material; (c) curing the catalysed resin formulation inside the porous material.

EP 2 886 302 A2 relates to the shaping and the production of reinforcing elements which pass through the thickness of the sandwich structure for reinforcement of sandwich structures. The process for producing reinforced sandwich structures disclosed there comprises the steps of: introducing a pin into a foamed or filled honeycomb core material, wherein the pin and the core material contain a thermoplastic or a mixture of thermoplastics and the pin is heated such that the core material softens or melts upon introduction of the pin at the introduction point; and/or the core material is heated at the introduction point so that the core material softens or melts.

WO 2015/066528 A1 discloses a composite material having a modulus of elasticity of less than 0.1 MPa at 100% elongation comprising a polymer matrix and a non-Newtonian fluid. The composite material may be employed in shock and impact absorption applications in order to reduce initial accelerative forces and accelerative forces brought about by shockwaves.

Most prior art processes for modifying foams are rather unspecific and are not suitable for the construction of complex structures inside the foam. It would therefore be a requirement that the complex structure be provided first and then overfoamed. Thus WO 87/01775 A1 discloses a spring element having at least two main parts and an array of shock absorbing curved elements which extend between the main parts and are integrally secured thereto by insert molding. The aforementioned main parts are in the form of cut-to-length hollow profiles having a number of openings for receiving the curved elements, wherein the curved elements have a diameter which is smaller than that of the aforementioned openings in order that elements may be arranged in the aforementioned openings at a desired predetermined angle. The cavity of the profiles is filled with a molding material. The aforementioned spring element may be embedded in a foam, preferably a polyurethane foam or polyethylene foam.

The embedding in a foam necessitates access to foaming plants with all of their capital and safety requirements. In order, given the ascending reaction mixture resulting in a foam, to achieve a predetermined orientation of the structures in the finished foam, said structures must be secured. Such securing elements would then extend as far as the outer surface of the foam which may be unwanted for mechanical and aesthetic reasons. A further aspect is that in overfoaming of closed structures the cavities of the structures cannot be filled by the foam.

It would be desirable for the production of foams functionalized with specific internal structures if stock foams could be purchased and subsequently functionalized. The present invention accordingly has for its object to provide such a process for producing a foam body having an internal structure.

The problem is solved in accordance with the invention by a process as claimed in claim 1. A foam body obtainable by the process according to the invention and having an internal structure forms the subject matter of claim 15. Advantageous developments are specified in the subsidiary claims.

A process according to the invention for producing a foam body having an internal structure comprises the steps of:

I) selecting an internal structure to be formed in the foam body, wherein the structure comprises a first polymeric material;

II) providing a foam body, wherein the foam body comprises a second polymeric material distinct from the first polymeric material;

III) injecting by means of an injection means a predetermined amount of a melt of the first polymeric material or a predetermined amount of a reaction mixture which reacts to afford the first polymeric material at a predetermined location inside the foam body which corresponds to a volume element of the internal structure;

IV) repeating step III) for further predetermined locations inside the foam body corresponding to further volume elements of the internal structure until the internal structure is formed.

A foam body having an internal structure obtainable by a process according to the invention, wherein the internal structure comprises a first polymeric material and the foam body comprises a second polymeric material and the material of the internal structure is distinct from the material of the foam body has the features that all surfaces of the internal structure contact the foam body, that the internal structure is a spring having a loading direction and that upon loading of the foam body at a location at which the internal structure is present and along the loading direction of the internal structure the determined compressive strength (40% compression, DIN EN ISO 3386-1:2010-09) is ≥10% to ≤10 000% higher than the compressive strength (40% compression, DIN EN ISO 3386-1:2010-09) of the foam body at a location at which no internal structure is present.

The present invention is in particular suitable for the modification of flexible foam bodies, such as are used in mattresses or cushioning elements. Multizone flexible foam bodies are complex and costly to produce since different foams and inserts require adhesive bonding to one another in a plurality of operations. In addition, these production processes provide only limited options for individual adaptation to persons or objects.

Compared to conventional processes the process according to the invention makes it possible to produce products such as multizone mattresses in a simpler and more cost-effective fashion since numerous process steps are integrated into a single step. Further functionalities may be integrated into foam objects which can also be individually adapted with little additional complexity through the use of digital manufacturing processes.

Injected patterns and structures make it possible to determine the characteristics of foams upon application of force so that only predefined deformations are allowed. It is further possible to use injected patterns to mark the foam in such a way as to impede counterfeiting.

This process thus makes it possible to achieve cost savings and process improvements for already established (flexible) foam applications as well as injection of complex and individualized shapes which unlock totally novel fields of application for the use of flexible foams.

Step (I) of the process according to the invention comprises selecting an internal structure to be formed in the foam body. This selecting is advantageously carried out in a CAD program which provides a three-dimensional model of the structure and in this three-dimensional model subdivides the structure into individual volume elements.

The internal structure may for example have a length of ≥0.1 mm to ≤5000 cm, preferably ≥0.5 mm to ≤1000 cm, more preferably ≥1 cm to ≤100 cm.

One example of such a structure to be formed in the foam body is a coil spring. Such coil springs may for example be provided in mattresses or cushions in order locally to form regions having an elevated compressive strength. Further examples of suitable structures include those which facilitate securing of the foam body. In the simplest case these may be solid volumes into which for example threads for receiving a screw connection are subsequently cut.

According to the invention it is provided that the internal structure to be formed comprises a first polymeric material. Suitable materials include for example thermoplastically processable plastics formulations based on polyamides, polyurethanes, polyesters, polyethers, polyimides, polyether ketones, polycarbonates, polyacrylates, polyolefins, polyvinyl chloride, polyoxymethylene and/or crosslinked materials based on polyepoxides, polyurethanes, polysilicones, polyacrylates, polyesters, rubber materials and mixtures and mixed polymers thereof.

The first polymeric material may be in the form of a solid or a foam. When the first polymeric material is a foam, weight savings may be realized.

Particularly suitable as the first polymeric material according to one aspect of the invention are thermoplastic elastomers (TPE), thermoplastic polyurethane (TPU), polycarbonate (PC), polyamide (PA), polyethylene terephthalate (PET), polybutylene terephthalate (PBT), cycloolefinic copolyester (COC), polyether ether ketone (PEEK), polyether amide ketone (PEAK), polyetherimide (PEI), polyimide (PI), polypropylene (PP) or polyethylene (PE), acrylonitrile butadiene styrene (ABS), polylactate (PLA), polymethyl methacrylate (PMMA), polystyrene (PS), polyvinyl chloride (PVC), polyoxymethylene (POM), polyacrylonitrile (PAN), polyacrylate or celluloid. TPU or PC are preferred.

Particularly suitable for construction of the first polymeric material according to a further aspect of the invention are chemically curable 2K polyurethane, 2K epoxide or moisture curable polyurethane systems, air curable or free-radically curable unsaturated polyesters or UV curable reactive resins, for example based on vinyl and acryloyl compounds, such as are described inter alia in EP 2 930 009 A2 and DE 10 2015100 816.

Step (II) of the process comprises providing a foam body, wherein the foam body comprises a second polymeric material distinct from the first polymeric material. This may also be for example a thermoplastic foam, a polyurethane resin foam, an epoxy resin foam, a polyester resin foam, a rubber foam, an acrylate resin foam or a polyolefin resin foam. It is possible for the internal structure and the foam body to comprise a material from the same substance class, the materials per se nevertheless being chemically distinct. One example is a foam body made of a flexible polyurethane foam and a structure made of an elastomeric polyurethane. The distinctness of the polymeric materials may also manifest in a distinctness of at least one physical property. For example the first polymeric material may be a polymer foam obtained from the same synthesis components as the foam of the second polymeric material but having a different density.

Step (III) of the process comprises injecting by means of an injection means a predetermined amount of a melt of the first polymeric material or a predetermined amount of a reaction mixture which reacts to afford the first polymeric material at a predetermined location inside the foam body. One example of an injection means is a cannula. Suitable internal diameters may be in the range from ≥50 µm to ≤5 mm, preferably ≥100 µm to ≤4 mm, more preferably ≥500 µm to ≤2.5 mm.

In the case of a thermoplastic polymer a melt of the polymer is injected. However, it is also possible to employ reactive resins as one-component or multicomponent systems in which a reaction mixture reacts to afford the desired polymeric material. The reaction mixture may be injected through the cannula in ready-mixed form or else be mixed only in the foam body through use of a cannula having a plurality of conduits for example.

The material for a volume element of the to-be-constructed internal structure provided for injection may be injected continuously or discontinuously. Depending on the nature of the foam the injected material may bring about local destruction of the foam and supplant the foam or else may displace the foam.

In the process according to the invention the material is preferably not injected into cavities that are already present in the foam and correspond to the shape of the volume element or the internal structure. This is an advantage of the process according to the invention since the upstream steps for providing the cavities to be filled are omitted. An open-celled or closed-celled foam unmodified in respect of its internal structure may be employed.

The injected quantity of material is supported by the surrounding form of the foam body and can therefore remain in the location intended therefor. The injected quantity of material corresponds, also in terms of its situation in the foam body, to a volume element of the internal structure to be formed. In contrast to layerwise additive manufacturing processes such as SLS or FDM the process according to the invention is not limited to layerwise construction of the structure but rather, on account of the supporting action of the foam, allows for much freer positioning of the material for the structure.

During injection in step III) the injection means may be stationary or in motion relative to the foam body. When the injection means is in motion, larger volume elements per injection operation may be constructed. It is preferable when the motion of the injection means is opposed to the direction of motion in which the injection means has penetrated into the foam body.

After the injection in step 1II) an injection channel brought about by the injection means in the foam may be sealed again. This may be achieved by introducing into the injection channel an adhesive or a reaction mixture which reacts to afford a polymer foam. This is preferably a reaction mixture which reacts to afford the polymer of the second polymeric material with or without blowing agent.

The injection in step III) is preferably performed using a multiaxial robot such as a 6-axis robot. Thus a 6-axis robot arm can move an injection means according to paths previously generated on a computer and inject patterns and shapes into the foam body.

The path of the injection in step III) is not limited to a particular spatial direction. It is possible for the individual injections to be carried out from very different directions. When the injection means is a cannula this means that the foam body is punctured uniformly so that local accumulation of parallel penetration channels and thus local weakening or destruction of the foam is avoided.

However, it is also possible that a local weakening or destruction of the foam material brought about by puncturing of the foam body by the injection means is used as a constructive feature for the foam body having an internal structure.

According to the instruction in step IV) of the process the injection step III) is repeated at further predetermined locations inside the foam body so that further volume elements of the internal structure to be formed are reproduced in the foam body by material injection. This is carried out until the target structure has been formed.

The internal structure may for example bring about a subtle or marked haptic alteration of the properties of the modified foam body which manifests for example in the form of altered damping characteristics, surface roughness or foam surface structure under stress. One example is the injection of small volume bodies of a material having a higher density than the foam directly below the foam surface which can result in an improvement in air circulation in the foam surface under stress.

The process according to the invention is capable of elevating the density of the foam body in a spatially specific fashion but based in total on the foam volume for example by >0.5% to <1000%.

Preferred embodiments of the invention are described hereinbelow. They may be combined with one another as desired unless the opposite is clear from the context.

In a preferred embodiment of the process the injected melts or the injected reaction mixtures become at least partially interconnected to afford a common volume element in two consecutive steps III). In the case of injection of a polymer melt the fact that the foam body acts as a thermal insulation means may be utilized. This facilitates the coalescing of the polymer melt injected in the individual injection steps.

In a further preferred embodiment of the process a plurality of different first polymeric materials are employed. For example 2, 3, 4 or 5 different first polymeric materials may be employed in the process according to the invention and these may also be injected by different means of application (polymer melt/reaction mixture). The different first polymeric materials may be compatible with one another which means that they can enter into a positive connection with one another. However, they may also be intentionally incompatible with one another when for example parts of a structure movable relative to one another are to be constructed.

In a further preferred embodiment of the process a plurality of different injection means are employed. The number of different injection means is in principle limited only by the geometry of the foam body and the space requirements of the injection means.

In a further preferred embodiment of the process a plurality of injection means differing in their mechanical construction are employed. The number of different injection means is in principle limited only by the geometry of the foam body and the space requirements of the injection means.

A distinguishing mechanical construction may for example be constituted by different internal diameters of employed cannulas.

In a further preferred embodiment of the process the foam body comprises a flexible foam having a compressive strength (40% compression, DIN EN ISO 3386-1:2010-09) of $\geq 10$ to $\leq 100$ kPa and a density (DIN EN ISO 845) of $\geq 10$ kg/m$^3$ to $\leq 100$ kg/m$^3$. Preference is given to compressive strengths in the range from $\geq 20$ to $\leq 80$ kPa, more preferably $\geq 30$ to $\leq 60$ kPa. Preferred densities are $\geq 20$ kg/m$^3$ to $\leq 80$ kg/m$^3$, more preferably $\geq 30$ kg/m$^3$ to $\leq 60$ kg/m$^3$.

In a further preferred embodiment of the process the second polymeric material is a polyurethane polymer. It is preferable when the second polymeric material is a flexible polyurethane foam obtainable from a reaction mixture comprising the components:

A1

A1.1 at least one polyether polyol having a functionality of 2 to 8, preferably of 2 to 6, particularly preferably of 2 to 4, an OH number according to DIN 53240 in a range from 20 to 70 mg KOH/g and a polyoxypropylene (PO) content in an amount of 50% to 100% by weight and a polyoxyethylene (EO) content in an amount of 0% to 50% by weight, A1.2 optionally at least one polyether polyol having a hydroxyl functionality of 2 to 8, preferably of 2 to 6, particularly preferably of 2, a hydroxyl (OH) number according to DIN 53240 in a range from 50 to 65 mg KOH/g and a PO content in an amount of 45% to 55% by weight and an EO content in an amount of 45% to 55% by weight; A1.3 optionally at least one dispersion of a polymer in a polyether polyol, wherein the OH number according to DIN 53240 of the dispersion is in a range from 10 to 30 mg KOH/g and wherein the polyether polyol has a hydroxyl functionality of 2 to 6, preferably of 2 to 4, particularly preferably of 3, a PO content in an amount of 70% to 90% by weight and an EO content in an amount of 10% to 30% by weight;

A1.4 optionally at least one polyether polyol having a functionality of 2 to 8, preferably of 2 to 6, particularly preferably of 3, an OH number in a range from 220 to 290 mg KOH/Wg and a PO content in an amount of up to 25% by weight and an EO content in an amount of at least 75% by weight;

A2 water and/or physical blowing agent,

A3 optionally compounds comprising isocyanate-reactive hydrogen atoms and having an OH number of 140 mg KOH/g to 900 mg KOH/g, A4 assistant and additive substances such as catalysts, surface-active additives, pigments or flame retardants and Component B: di- and/or polyisocyanates, preferably diisocyanates.

The production of the flexible PUR foam is generally carried out at an NCO index of 70 to 130, preferably of 80 to 115, particularly preferably of 85 to 95.

In a further preferred embodiment of the process the internal structure selected in step I) is adapted to alter the deformation behavior of the foam body under tensile load, compressive load and/or shear load such that upon deformation under the load a volume element of the foam body which encompasses the internal structure undergoes a change to a volume of ≤10% (preferably ≥50%, more preferably ≥100%) relative to the volume of a volume element of the foam body (10) which comprises no internal structure (100). The change in volume under load may be simulated by FEM calculation or else determined experimentally. For example in a foam body a volume element having the internal structure is compressible from a starting volume of 100 cm$^3$ to 75 cm$^3$ and a volume element without internal structure is compressible from 100 cm$^3$ to 50 cm$^3$ under the same compressive stress. After loading the volume of the volume element having the internal structure is then 150% of the volume of the volume element without internal structure.

In a further preferred embodiment of the process the internal structure selected in step I) is a leaf spring, spiral torsion spring, elliptical spring, parabolic spring, wave spring, leg spring, rod spring, coil spring, disk spring, a thread or a socket for bayonet mounts.

In a further preferred embodiment of the process the internal structure selected in step I) is a plurality of non-interconnected spherical, elliptical or rod-shaped volumes or a plurality of interconnected spherical, elliptical or rod-shaped volumes. Spherical volumes may be achieved by injection of a material without moving the injection means during the injection operation. Similarly, rod-shaped volumes may be constructed via a linear motion of the injection means during the injection operation. The term "spherical" includes deviations from the ideal sphere where the smallest distance and the largest distance of the surface of the volume from the geometric midpoint of the volume differ from one another by not more than 20%, preferably not more than 10%.

Rod-shaped volumes may be interconnected such that two volumes converge at their ends and thus form a "V-shaped" entity. The angle between the legs of the "V-shaped" entity may be 5° to 85°, preferably 15° to 60°. It is also possible for more than two, for example 3 or four, rod-shaped volumes to converge at a common point. The figure formed may be described such that the rod-shaped volumes form at least some of the edges of a notional pyramid.

Rod-shaped volumes may also be interconnected such that a plurality of the volumes forms a network with node points. It is preferable when the node points are distributed in a periodically repeating manner in at least a portion of the volume of the body. If the node points are distributed in a periodically repeating manner in a volume this may be described using the terms of crystallography. The node points may be arranged according to the 14 Bravais lattices: simple cubic (sc), body-centered cubic (bcc), face-centered cubic (fcc), simple tetragonal, body-centered tetragonal, simple orthorhombic, base-centered orthorhombic, body-centered orthorhombic, face-centered orthorhombic, simple hexagonal, rhombohedral, simple monoclinic, base-centered monoclinic and triclinic. The cubic lattices sc, fcc and bcc are preferred.

Persisting with the crystallographic perspective the number of rod-shaped volumes by means of which one node point is connected to other node points may be regarded as the coordination number of the node point. The average number of rod-shaped volumes that emanate from the node points may be ≥4 to ≤12 but it is also possible to achieve coordination numbers that are unusual or impossible in crystallography.

In a further preferred embodiment of the process the first polymeric material is a polyurethane polymer. This polyurethane polymer is preferably obtained from a reaction mixture comprising the following components:

i) a polyisocyanate,
ii) optionally a polyisocyanate prepolymer
iii) a compound having at least two isocyanate-reactive groups, preferably hydroxyl groups.

Suitable as the polyisocyanate and component i) are, for example, 1,4-butylene diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof with any isomer content, 1,4-cyclohexylene diisocyanate, 4-isocyanatomethyl-1,8-octane diisocyanate (nonane triisocyanate), 1,4-phenylene diisocyanate, 2,4- and/or 2,6-tolylene diisocyanate, 1,5-naphthylene diisocyanate, 2,2'- and/or 2,4'- and/or 4,4'-diphenylmethane diisocyanate, 1,3- and/or 1,4-bis(2-isocyanatoprop-2-yl)benzene (TMXDI), 1,3-bis(isocyanatomethyl)benzene (XDI), alkyl 2,6-diisocyanatohexanoates (lysine diisocyanates) having alkyl groups having 1 to 8 carbon atoms and mixtures thereof. Compounds which contain uretdione, isocyanurate, biuret, iminooxadiazinedione or oxadiazinetrione structures and are based on the recited diisocyanates are also suitable building blocks of component i).

In one embodiment component i) may be a polyisocyanate or a polyisocyanate mixture having an average NCO functionality of 2 to 4 with exclusively aliphatically or cycloaliphatically bonded isocyanate groups. Preferably concerned are polyisocyanates or polyisocyanate mixtures of the abovementioned type comprising uretdione, isocyanurate, biuret, iminooxadiazinedione or oxadiazinetrione structures and mixtures thereof and an average NCO functionality of the mixture of 2 to 4, preferably of 2 to 2.6 and particularly preferably of 2 to 2.4.

Employable with particular preference as component i) are polyisocyanates based on hexamethylene diisocyanate, isophorone diisocyanate or the isomeric bis(4,4'-isocyanatocyclohexyl)methanes and mixtures of the abovementioned isocyanates.

The polyisocyanate prepolymers employable as component ii) are obtainable by reaction of one or more diisocyanates with one or more hydroxy-functional, in particular polymeric, polyols optionally with addition of catalysts and auxiliary and additive substances. Also employable in addition are components for chain extension, for example with primary and/or secondary amino groups ($NH_2$- and/or NH-functional components) for formation of the polyisocyanate prepolymer. The polyisocyanate prepolymer as component ii) may preferably be obtainable from the reaction of polymeric polyols and aliphatic diisocyanates. Preferred as component ii) are polyisocyanate prepolymers based on polypropylene glycol as the polyol and hexamethylene diisocyanate as the aliphatic diisocyanate.

Hydroxy-functional polymeric polyols for conversion into the polyisocyanate prepolymer B) may for example also be polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polyurethane polycarbonate polyols and/or polyester polycarbonate polyols. These may be employed to produce the polyisocyanate prepolymer individually or in any desired mixtures with one another.

Suitable polyester polyols for producing the polyisocyanate prepolymers ii) may be polycondensates of di- and optionally tri- and tetraols and of di- and optionally tri- and tetracarboxylic acids or hydroxycarboxylic acids or lactones. Also employable for producing the polyesters instead of the free polycarboxylic acids are the corresponding polycarboxylic anhydrides or corresponding polycarboxylic esters of lower alcohols.

Examples of suitable diols include ethylene glycol, butylene glycol, diethylene glycol, triethylene glycol, polyalkylene glycols such as polyethylene glycol and also 1,2-propanediol, 1,3-propanediol, 1,3-butanediol, 1,4-butanediol, 1,6-hexanediol and isomers, neopentyl glycol or neopentyl glycol hydroxypivalate or mixtures thereof, wherein 1,6-hexanediol and isomers, 1,4-butanediol, neopentyl glycol and neopentyl glycol hydroxypivalate are preferred. Also employable are polyols such as trimethylolpropane, glycerol, erythritol, pentaerythritol, trimethylolbenzene or trishydroxyethyl isocyanurate or mixtures thereof.

Employable dicarboxylic acids are phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. Acid sources that may be used further include the corresponding anhydrides.

Provided that the average functionality of the polyol to be esterified is ≥2, it is also possible to use monocarboxylic acids such as benzoic acid and hexanecarboxylic acid.

Preferred acids are aliphatic or aromatic acids of the abovementioned type. Particularly preferred are adipic acid, isophthalic acid and phthalic acid.

Hydroxycarboxylic acids that may be co-used as reaction participants in the production of a polyester polyol having terminal hydroxyl groups are for example hydroxycaproic acid, hydroxybutyric acid, hydroxydecanoic acid or hydroxystearic acid or mixtures thereof. Suitable lactones are caprolactone, butyrolactone or homologs or mixtures thereof. Caprolactone is preferred.

Likewise employable for producing the polyisocyanate prepolymers ii) are hydroxyl-containing polycarbonates, for example polycarbonate polyols, preferably polycarbonate diols. For example these may have a number-average molecular weight $M_n$ of 400 g/mol to 8000 g/mol, preferably of 600 g/mol to 3000 g/mol. These are obtainable by reaction of carbonic acid derivatives, such as diphenyl carbonate, dimethyl carbonate or phosgene, with polyols, preferably diols.

Examples of diols suitable therefor are ethylene glycol, 1,2- and 1,3-propanediol, 1,3- and 1,4-butanediol, 1,6-hexanediol, 1,8-octanediol, neopentyl glycol, 1,4-bishydroxymethylcyclohbexane, 2-methyl-1,3-propanediol, 2,2,4-trimethylpentane-1,3-diol, dipropylene glycol, polypropylene glycols, dibutylene glycol, polybutylene glycols, bisphenol A or lactone-modified diols of the abovementioned type or mixtures thereof.

The diol component preferably contains from 40 percent by weight to 100 percent by weight of hexanediol, preferably 1,6-hexanediol and/or hexanediol derivatives. These hexanediol derivatives are based on hexanediol and may comprise not only terminal OH groups but also ester groups or ether groups. These derivatives are obtainable for example by reaction of hexanediol with excess caprolactone or by etherification of hexanediol with itself to afford di- or trihexylene glycol. In the context of the present invention the amounts of these and other components are selected in known fashion such that the sum does not exceed 100 percent by weight and in particular equals 100% by weight.

Hydroxyl-containing polycarbonates, in particular polycarbonate polyols, are preferably linear.

Polyether polyols are likewise employable for producing the polyisocyanate prepolymers ii). Polytetramethylene glycol polyethers such as are obtainable by polymerization of tetrahydrofuran by cationic ring opening are suitable for example. Likewise suitable polyether polyols may include adducts of styrene oxide, ethylene oxide, propylene oxide, butylene oxide and/or epichlorohydrin onto di- or polyfunctional starter molecules. Employable suitable starter molecules include for example water, butyl diglycol, glycerol, diethylene glycol, trimethylolpropane, propylene glycol, sorbitol, ethylenediamine, triethanolamine or 1,4-butanediol or mixtures thereof.

Preferred components for producing the polyisocyanate prepolymers ii) are polypropylene glycol, polytetramethylene glycol polyether and polycarbonate polyols or mixtures thereof, wherein polypropylene glycol is particularly preferred.

Polymeric polyols having a number-average molecular weight $M_n$ of 400 g/mol to 8000 g/mol, preferably of 400 g/mol to 6000 g/mol and particularly preferably of 600 g/mol to 3000 g/mol may be employed. Said polyols preferably have an OH functionality of 1.5 to 6, particularly preferably of 1.8 to 3, very particularly preferably of 1.9 to 2.1.

The production of the polyisocyanate prepolymers ii) may employ not only the recited polymeric polyols but also short-chain polyols. Employable are for example ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, neopentyl glycol, hydroquinone dihydroxyethyl ether, bisphenol A (2,2-bis(4-hydroxyphenyl)propane), hydrogenated bisphenol A (2,2-bis(4-hydroxycyclohexyl)propane), trimethylolpropane, trimethylolethane, glycerol or pentaerythritol or a mixture thereof.

Also suitable are esterdiols of the recited molecular weight range such as α-hydroxybutyl ε-hydroxycaproate, ω-hydroxyhexyl γ-hydroxybutyrate, f-hydroxyethyl adipate or bis(-hydroxyethyl) terephthalate.

Also employable for producing the polyisocyanate prepolymers ii) are monofunctional isocyanate-reactive, hydroxyl-containing compounds. Examples of such monofunctional compounds are ethanol, n-butanol, ethylene glycol monobutyl ether, diethylene glycol monomethyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol or 1-hexadecanol or mixtures thereof.

To produce the polyisocyanate prepolymers ii) diisocyanates may preferably be reacted with the polyols at a ratio of isocyanate groups to hydroxyl groups (NCO/OH ratio) of 2:1 to 20:1, for example of 8:1. This may form urethane and/or allophanate structures. A proportion of unconverted polyisocyanates may subsequently be removed. This may be carried out for example using a thin-film distillation to obtain low residual monomer products having residual monomer contents of for example ≤1 weight percent, preferably ≤0.5 weight percent, particularly preferably ≤0.1 weight percent. The reaction temperature may be from 20° C. to 120° C., preferably from 60° C. to 100° C. Stabilizers such as benzoyl chloride, isophthaloyl chloride, dibutyl phosphate, 3-chloropropionic acid or methyl tosylate may be added during production.

Also employable in addition for chain extension in the production of the polyisocyanate prepolymers ii) are $NH_2$- and/or NH-functional components.

Suitable components for chain extension are organic di- or polyamines. Examples of employable compounds include ethylenediamine, 1,2-diaminopropane, 1,3-diaminopropane, 1,4-diaminobutane, 1,6-diaminohexane, isophoronediamine, isomer mixture of 2,2,4- and 2,4,4-trimethylhexamethylenediamine, 2-methylpentamethylenediamine, diethylenetriamine, diaminodicyclohexylmethane or dimethylethylenediamine or mixtures thereof.

Also employable for producing the polyisocyanate prepolymers ii) are compounds which comprise not only a primary amino group but also secondary amino groups or not only an amino group (primary or secondary) but also OH groups. Examples thereof are primary/secondary amines such as diethanolamine, 3-amino-1-methylaminopropane, 3-amino-1-ethylaminopropane, 3-amino-1-cyclohexylaminopropane, 3-amino-1-methylaminobutane, alkanolamines such as N-aminoethylethanolamine, ethanolamine, 3-aminopropanol, neopentanolamine. For chain termination it is customary to use amines having an isocyanate-reactive group, for example methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine, or suitable substituted derivatives thereof, amide amines formed from diprimary amines and monocarboxylic acids, monoketime of diprimary amines, primary/tertiary amines, such as N,N-dimethylaminopropylamine.

The polyisocyanate prepolymers or mixtures thereof employed as component ii) may preferably have an average NCO functionality of 1.8 to 5, particularly preferably 2 to 3.5 and very particularly preferably 2 to 2.5

Component iii) is a compound having at least two isocyanate-reactive hydroxyl groups. For example component iii) may be a polyamine or a polyol having at least two isocyanate-reactive hydroxyl groups.

Employable components iii) include hydroxy-functional, in particular polymeric, polyols, for example polyether polyols. Polytetramethylene glycol polyethers such as are obtainable by polymerization of tetrahydrofuran by cationic ring opening are suitable for example. Likewise suitable polyether polyols may include adducts of styrene oxide, ethylene oxide, propylene oxide, butylene oxide and/or epichlorohydrin onto di- or polyfunctional starter molecules. Employable suitable starter molecules include for example water, butyl diglycol, glycerol, diethylene glycol, trimethylolpropane, propylene glycol, sorbitol, ethylenediamine, triethanolamine or 1,4-butanediol or mixtures thereof.

It is preferable when component iii) is a polymer having 2 to 4 hydroxyl groups per molecule, very particularly preferably a polypropylene glycol having 2 to 3 hydroxyl groups per molecule. It is preferable in accordance with the invention when the polymeric polyols from C) have a particularly narrow molecular weight distribution, i.e. a polydispersity (PD=$M_w/M_n$) of 1.0 to 1.5 and/or an OH-functionality of more than 1.9. It is preferable when the recited polyether polyols have a polydispersity of 1.0 to 1.5 and an OH functionality of more than 1.9, particularly preferably not less than 1.95.

Such polyether polyols are obtainable in a manner known per se by alkoxylation of suitable starter molecules, in particular using double metal cyanide catalysts (DMC catalysis). This method is described for example in patent specification U.S. Pat. No. 5,158,922 and in laid-open specification EP 0 654 302 A1.

The reaction mixture for the polyurethane is obtainable by mixing the components i), ii) and iii). The ratio of isocyanate-reactive hydroxyl groups to free isocyanate groups is preferably 1:1.5 to 1.5:1, particularly preferably from 1:1.02 to 1:0.95.

It is preferable when at least one of the components i), ii) or iii) has a functionality of ≥2.0, preferably of ≥2.5 preferably of ≥3.0, in order to introduce branching or crosslinking into the polymer element. The term "functionality" refers in the case of components i) and ii) to the average number of NCO groups per molecule and in the case of component iii) to the average number of OH groups per molecule. This branching or crosslinking brings about better mechanical properties and better elastomeric properties, in particular better elongation properties.

The polyurethane may advantageously exhibit good mechanical strength and high elasticity. In particular the polyurethane may have a maximum stress of ≥0.2 MPa, in particular of 0.4 MPa to 50 MPa, and a maximum elongation of ≥250%, in particular of ≥350%. The polyurethane may furthermore exhibit a stress of 0.1 MPa to 1 MPa, for example of 0.1 MPa to 0.8 MPa, in particular of 0.1 MPa to 0.3 MPa, in the working elongation range of 50% to 200% (determination according to DIN 53504). The polyurethane may further exhibit a modulus of elasticity of 0.1 MPa to 10 MPa, for example of 0.2 MPa to 5 MPa, at an elongation of 100% (determination according to DIN EN 150 672 1-1).

In addition to the components i), ii) und iii) the reaction mixture may in addition also contain auxiliary and/or additive substances. Examples of such auxiliary and additive substances are crosslinkers, thickeners, cosolvents, thixotropic agents, stabilizers, antioxidants, light stabilizers, emulsifiers, surfactants, adhesives, plasticizers, hydrophobizing agents, pigments, fillers and flow control agents.

In a further preferred embodiment of the process a plurality of internal structures of identical or different construction are formed in the foam body. For example a plurality of springs may be provided at certain regions of a mattress or a seat cushion.

In a further preferred embodiment of the process a plurality of steps III) are performed simultaneously. The construction of the desired internal structure is thus expedited if a plurality of injection means are available.

In a further preferred embodiment of the process the predetermined amount in step III) has a volume of $\geq 10$ µL to $\leq 1000$ mL. This volume is preferably $\geq 50$ µL to $\leq 50$ mL, more preferably $\geq 100$ µL to $\leq 5$ mL.

In a further preferred embodiment of the process the injection means in step III) is a cannula, the end of the cannula is moved to the predetermined location of the foam body for injection of the predetermined amount and the movement of the end of the cannula is performed such that first polymeric material already present in the foam body is not contacted by the cannula. This prevents the cannula from damaging the structure present in the construction.

In a further preferred embodiment of the process formation of the internal structure is followed by performance of a material-removing after treatment step on the foam body having the internal structure. This is advantageous if the intended shape of the foam body is such that little foam volume would be available to support the inner structure present in the construction. In this case a foam body having sufficient dimensions would initially be employed in the process according to the invention and the end shape would subsequently be obtained via the after treatment step.

Articles advantageously producible by the process according to the invention include for example shoe inserts, shoe soles, protectors, backpacks, cushioning elements, baby mats, orthopedic seat cushions, connecting elements, office chair seat bases, transit protection articles, inserts for containers, cosmetic sponges, neck-supporting pillows, mattresses, pillows, cleaning sponges, robotic grippers, sound absorbers, sound-insulated stair treads, neck braces, plaster and rail systems, cushioning pads for training apparatus, sports mats, apparatus grips, bicycle seats, car seats and/or seating furniture. Details are specified in the following table without being limited thereto:

| Product | Examples/comments |
|---|---|
| Shoe inserts | Orthopedic shoe inserts |
| | Foot malalignment may be corrected by individually adaptable hardening of the flexible foam insert. |
| | Muscle stimulating structures |
| | A support structure integrated into the foam improves posture and movement, relaxes the musculature in the sole of the foot and the calf muscles and improves the stability and balance of the wearer. |
| | Athlete's shoe inserts |
| | A shoe insert which promotes natural rollover of the foot with a variable degrees of hardness for loading and unloading and insulating the different regions of the foot. |
| | Diabetic adaptive inserts |
| | Uniform distribution of body weight, avoidance of pressure hotspots and pressure relief attuned to the individual illness-contingent foot situation. |
| | Cast shoe foam inserts |
| | The foam insert of the cast shoe is partially hardened in order to secure and limit the movement of regions of the foot. Ensures physiologically correct gait. |
| Shoe soles | Flip-flops |
| | Footbed adapted to 3-D scan of the foot, for example in the form of longitudinal arch supports or heel cups. |
| | Sports shoes |
| | Different degrees of hardness and kinetic structures in the shoe sole for the particular sport-induced load influence on the gait. |
| | Cushioning structures in running shoes |
| | Integrated spring structures support and cushion the stepping motion of the wearer, preferably used for running shoes. |
| Protectors | Kinetic protectors |
| | The particular body part is protected from blows or impacts by an insulating foam layer. The movement of the body part to be protected is moreover promoted and supported by a special kinetic structure in the foam. The musculature is likewise supported. |
| | Skeletal armoring |
| | The protective foam structure is yet further reinforced by an additional integrated skeleton. |
| Backpack cushioning elements | Pressure distribution and stabilization |
| | A support structure injected into the foam distributes the pressure resulting from the weight of the backpack and the oscillations thereof uniformly over the shoulder region and thus provides additional support and stability. |
| | Conforming arm straps |
| | A flexible fin-ray structure which wraps around the shoulders when donning the backpack in order to ensure greater support. |

-continued

| Product | Examples/comments |
|---|---|
| Baby mats | Head- and sleeping position-supporting sleep mat<br>The head of the baby is supported by a supporting structure in the viscoelastic foam of the sleep mat. Further foam elements support the waist of the baby in its sleeping position.<br>Breastfeeding pillow<br>A supporting structure stabilizes the reclining baby while it is breastfed. |
| Orthopedic seat cushions | Coccyx cushion<br>A structure which unloads the coccyx and promotes straightening of the spine is printed into any desired foam cushion shape which may appear different to a conventional seat cushion shape. |
| Connecting elements | Anchor points for external elements<br>Certain locations may be hardened and provide support for the mounting of screws or the like.<br>Modular push-fit system<br>Snap-fit hooks and eyes may be integrated into the foam block and need only be connected to one another at the use location.<br>Push-fit adapters for external systems<br>Adapters for other systems (threads, snap-fit hooks, bolts) may be printed into the foam. The shape size and spacing thereof may be adapted to the particular situation. |
| Office chair seat bases | Gym ball structure<br>An integrated kinetic structure made of a flexible material continually compels the user to balance. The principle is based on that of sitting on a gym ball which stimulates a particular musculature.<br>Dynamic seat structure<br>A structure in the foam seat base compels the body into a minimal level of activity, ensures constant balancing of the body and promotes straightening of the spine. |
| Transit protection articles Inserts for containers | Tailored protective walls in tool case<br>The foam surface made of flexible foam is reinforced in its protective function by a hardening structure while no material was injected at the locations where an object is to be placed. Recesses into which the object may be placed are thus formed and said object therefore obtains a supporting outer wall present in the foam. |
| Cosmetic sponges | Blending sponge with additional grip<br>An imprinted structure makes the blending sponge easier to hold and to guide.<br>Cleaning tools for makeup brushes<br>An integrated rippled surface allows for excellent cleaning of makeup brushes and utensils. |
| Neck-supporting pillows | Bathtub neck pillows<br>A neck pillow which is secured to the edge of a bathtub by a stiffened reverse side and which supports the neck on the flexible foam when reclining by means of its integrated structure.<br>Neck cushion<br>An integrated structure ensures optimal support of the head and unloads the neck musculature. |
| Mattresses | Mattress with integrated slat frame<br>A structure injected into the mattress assumes the function of the slat frame. This has the result that the consumer is left with only one mutually optimized element.<br>Mattress with individualized hardness distribution<br>Mattresses may be individually adapted to the user with different hardness regions and can thus optimize rest during reclining.<br>Mattress with intelligent protection mechanisms<br>A kinetically active structure prevents persons from being able to fall out of bed during sleep. To this end the structure signals to the user that he is approaching the edge of the bed by raising the edges and thus allows for peaceful and uninterrupted sleep.<br>Surface haptics<br>Special structures injected near to the foam surface elicit pleasant and soothing perceptions and thus offer the user relaxing rest. |
| Pillows | Individualized hardness distribution<br>Pillows may be adapted to the user with harder and softer areas. Installing of different components is no longer necessary. IFP may additionally be hardened with a finer resolution.<br>Integrated supporting and unloading functions |

-continued

| Product | Examples/comments |
|---|---|
| | A particular structure which prevents head rollover during sleep may be present in the pillow. This is advantageous especially in the case of neck injuries in order thus to relax the neck musculature. |
| Cleaning sponges | Cleaning sponge with integrated pressure pearls
The structure injected into the sponge provides the user with an improved cleaning action. By application of the sponge to an object the protruding pressure points ensure that soiling can be detached more easily.
Cleaning sponge with integrated bristles
Wipe or scrub, small bristles extend depending on the pressure applied to the sponge.
Corner sponge
An integrated wedge-shaped structure allows optimal cleaning of right-angled corners and orthogonal intermediate surfaces.
Click-in mop
The cleaning sponge is provided with integrated click-in elements so that it may be automatically secured to the end of the cleaning mop.
Shoe polish sponge
An integrated structure providing mild resistance promotes distribution of the shoe polish on the shoe surface. Such a combination of a sponge and a brush may be used particularly for suede shoes. |
| Robotic grippers | Integrated gripper structure
A structure printed into the foam ensures that the foam exerts a gripping movement upon activation of the structure. This makes it possible to grip and move particularly sensitive and fine objects with a robotic system. |
| Sound absorbers | Sound absorption through a varying foam structure
Imprinted structures ensure that the sound is refracted several times and thus absorbed. Computer-aided injection processes allow for an an optimized absorption behavior which is tailored to the particular situation.
Self-supporting sound absorber walls
Self-supporting sound absorbers made of foam which are acoustically active and also function as room dividers/walls. |
| Sound-insulated stair treads | Self-supporting foam stair treads
Supporting structure integrated into foam for quiet and soft stair treads which do not transmit impact sound to the supports.
Load-distributing structure for foam stair treads
In the case of point loading a special structure distributes the load over the entire foam in order thus to provide more support and avoid "fallaway" during use. |
| Neck braces | Integrated and individualized reinforcement
Patient-tailored reinforcement of the foam placed around the neck. The structure in the foam makes it possible to provide more wear comfort and better stabilization of the neck position. |
| Plaster and rail | Integrated and individualized reinforcement
Patient-tailored reinforcement of the foam tied around the affected area. The foam makes it possible to provide more wear comfort and better stabilization. |
| Cushioning pad for training apparatus | Integrated compulsory operation for fitness apparatus
Optimized movement control for fitness exercises via injected structures. These provide the user with support and prevent the occurrence of injuries by incorrect performing of movement sequences. |
| Sports mats | Load-distributing structure for sports mats
In the case of point loading a special structure distributes the load over the entire foam in order thus to provide more support and avoid "fallaway" during use. |
| Apparatus grips | Individualized apparatus grips
A structure imprinted into the grip which is adapted to the ergonomics of the user allows optimal grip and operation of the particular apparatus. |
| Bicycle seats | Adaptive bicycle seat
A structure printed into the bicycle seat adapts to the particular posture of the cyclist and thus allows optimized support, comfort and maximum force transfer at all times.
Tailored bicycle seat
A 3-D scan of the cyclist is used to produce a saddle which on account of the integrated structure may be adapted to his anatomy and ergonomic requirements, |
| Car seats | Cornering- and acceleration-adaptive car seats
A structure integrated into the seat provides the driver with increased support and thus provides more safety in road traffic during occurence of g-forces. |

| Product | Examples/comments |
|---|---|
| | Integrated entry and exit aid for car seats<br>A structure integrated into the seat supports the driver during entry and exit by turning away the driver's seat.<br>Car seat with integrated frame<br>A structure imprinted into the flexible foam assumes the function of a frame and thus allows for easier and more cost-effective production of car seats. |
| Seating furniture | Foam armchair<br>A flexible foam shape contains a sphere cloud structure which forms a seat bowl and backrest as soon as a person sits down on the foam shape.<br>Integrated seating furniture legs<br>A structure projecting from the inside of the from functions as a leg element of a piece of furniture. |

The foam body having an internal structure obtainable by a process according to the invention, wherein the internal structure comprises a first polymeric material and the foam body comprises a second polymeric material and the material of the internal structure is distinct from the material of the foam body has the initial feature that all surfaces of the internal structure contact the foam body. This is to be understood as meaning in particular that there are no cavities between the structure and the foam body, it being appreciated that this excludes cavities present in the foam itself. It is preferable when the contact is a positive contact so that mechanical forces may be more readily transferred between the foam body and the structure.

It is further provided that the internal structure is a spring having a loading direction. The loading direction of the spring is the direction upon which the design of the spring is based. Upon loading of the foam body at a location at which the internal structure is present and upon loading along the loading direction of the internal structure the determined compressive strength (40% compression, DIN EN ISO 3386-1:2010-09) is ≥10% to ≤100% higher than the compressive strength (40% compression, DIN EN ISO 3386-1:2010-09) of the foam body at a location at which no internal structure is present. According to the application the term spring is to be understood as meaning any structure which makes it possible to bring about the described change in compressive strength.

The spring integrated into the foam body thus brings about a local elevation in compressive strength compared to regions of the foam body in which no spring is integrated and only the foam of the foam body thus determines compressive strength. The compressive strength is preferably ≥20% to ≤80% higher, more preferably ≥30% to ≤70%.

The presence of the internal structure in the foam body may have a synergistic effect in terms of local compressive strength when the deformation of the foam is influenced by the internal structure and the deformation of the structure is influenced by the foam.

In a preferred embodiment of the foam body having an internal structure the first polymeric material is a polyurethane polymer To avoid repetition reference is made to the intimations concerning the polyurethane polymer for the first polymeric material made in connection with the process according to the invention.

In a further preferred embodiment of the foam body having an internal structure the second polymeric material is a polyurethane polymer. To avoid repetition reference is made to the intimations concerning the polyurethane polymer for the second polymeric material made in connection with the process according to the invention.

In a further preferred embodiment of the foam body having an internal structure the structure is a leaf spring, spiral spring, elliptical spring, parabolic spring, wave spring, leg spring, rod spring, coil spring or disk spring.

In a further preferred embodiment of the foam body having an internal structure the internal structure is a plurality of non-interconnected spherical, elliptical or rod-shaped volumes or a plurality of interconnected spherical, elliptical or rod-shaped volumes. The term "spherical" includes deviations from the ideal sphere where the smallest distance and the largest distance of the surface of the volume from the geometric midpoint of the volume differ from one another by not more than 20%, preferably not more than 10%.

Rod-shaped volumes may be interconnected such that two volumes converge at their ends and thus form a "V-shaped" entity. The angle between the legs of the "V-shaped" entity may be 5° to 85°, preferably 15° to 60°. It is also possible for more than two, for example 3 or four, rod-shaped volumes to converge at a common point. The figure formed may be described such that the rod-shaped volumes form at least some of the edges of a notional pyramid.

Rod-shaped volumes may also be interconnected such that a plurality of the volumes forms a network with node points. It is preferable when the node points are distributed in a periodically repeating manner in at least a portion of the volume of the body. If the node points are distributed in a periodically repeating manner in a volume this may be described using the terms of crystallography. The node points may be arranged according to the 14 Bravais lattices: simple cubic (sc), body-centered cubic (bcc), face-centered cubic (fcc), simple tetragonal, body-centered tetragonal, simple orthorhombic, base-centered orthorhombic, body-centered orthorhombic, face-centered orthorhombic, simple hexagonal, rhombohedral, simple monoclinic, base-centered monoclinic and triclinic. The cubic lattices sc, fcc and bcc are preferred.

Persisting with the crystallographic perspective the number of rod-shaped volumes by means of which one node point is connected to other node points may be regarded as the coordination number of the node point. The average number of rod-shaped volumes that emanate from the node points may be ≥4 to ≤12 but it is also possible to achieve coordination numbers that are unusual or impossible in crystallography.

The present invention is more particularly elucidated using the figures which follow and with reference to particular embodiments without, however, being limited thereto.

FIG. 5-23b show foam bodies according to the invention

Step (I) of the process according to the invention comprises selecting an internal structure to be formed in the foam body. This selecting is advantageously carried out in a CAD program which provides a three-dimensional model of the structure and in this three-dimensional model subdivides the structure into individual volume elements.

Figure 1:
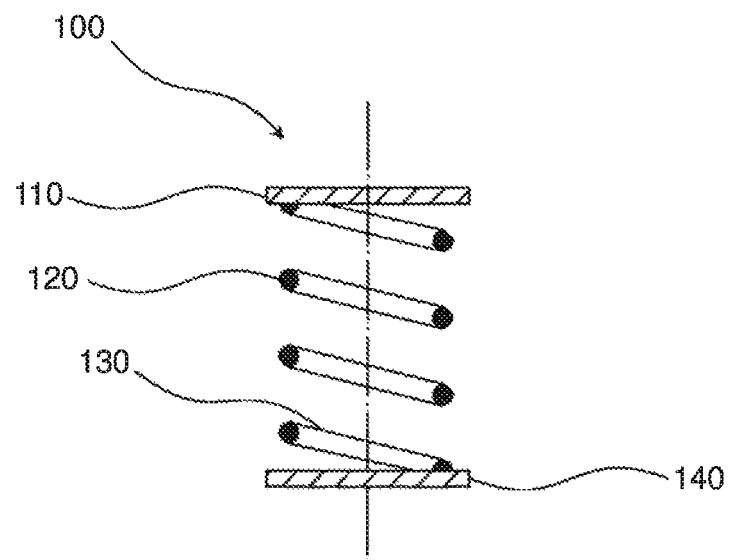
FIG. 1 shows an internal structure to be formed in the foam body

One example of such a structure to be formed in the foam body is shown in FIG. 1. What is concerned here is a coil spring 100 which is shown in cross section. The coil spring 100 further comprises a top plate 110 and a base plate 140. Cross sections 120 and segments 130 of the spring disposed behind the sectional plane define the coil spring 100.

Such coil springs 100 may be provided in mattresses or cushions for example, so that local regions having an elevated compressive strength are formed. In connection with placement in a mattress or a cushion the top plate 110 and the bottom plate 140 are used for better introduction of compression forces into the spring 100.

Figure 2:
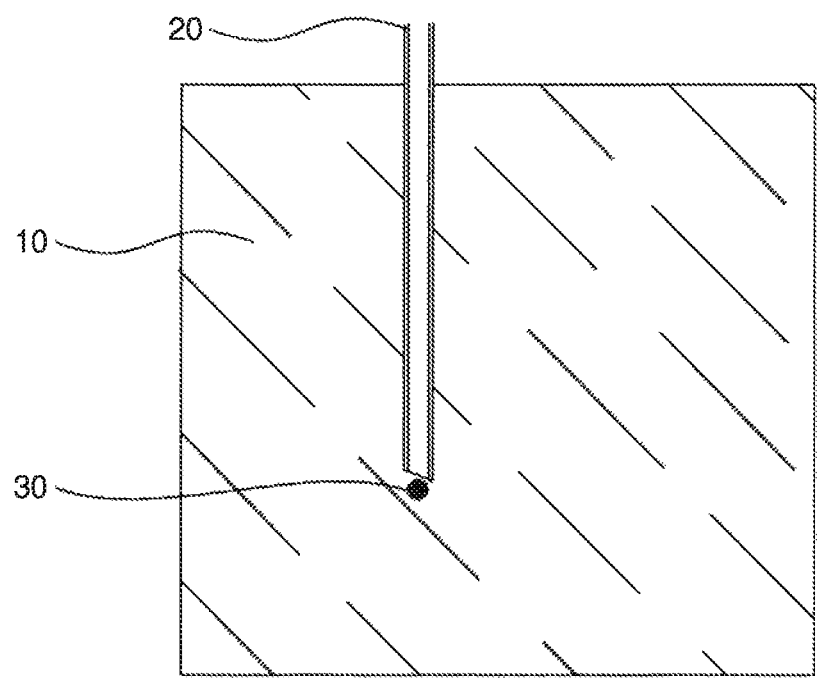
FIG. 2 shows a step in the process according to the invention

FIG. 2 is a schematic diagram of step III) of the process according to the invention. Into the foam body 10, using an injection means in the form of a cannula 20, a predetermined amount of material is injected into the foam body 10. In the case of a thermoplastic polymer a melt of the polymer is injected. However, it is also possible to employ multicomponent systems in which a reaction mixture reacts to afford the desired polymeric material. The reaction mixture may be injected through the cannula 20 in ready-mixed form or else be mixed only in the foam body 10 through use of a cannula having a plurality of conduits for example.

In a particular embodiment the reactive material may also be injected separately (even geometrically from different spatial directions) via two independent injection means such as cannulas for example and then combined in the target location. However it is also possible that a single injection means is provided for combining different streams of the components of a reactive material in the target location.

The injected quantity of material 30 is supported by the surrounding foam of the foam body 10 and can therefore remain in the location intended therefor. The injected quantity of material 30 corresponds, also in terms of its situation in the foam body 10, to a volume element of the internal structure to be formed.

Figure 3:
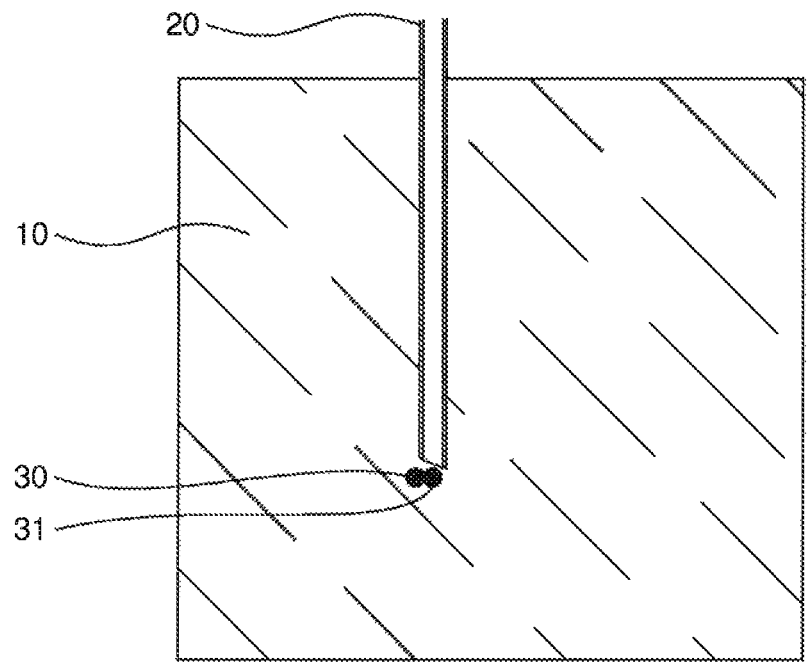
FIG. 3 shows a further step in the process according to the invention
Figure 4:
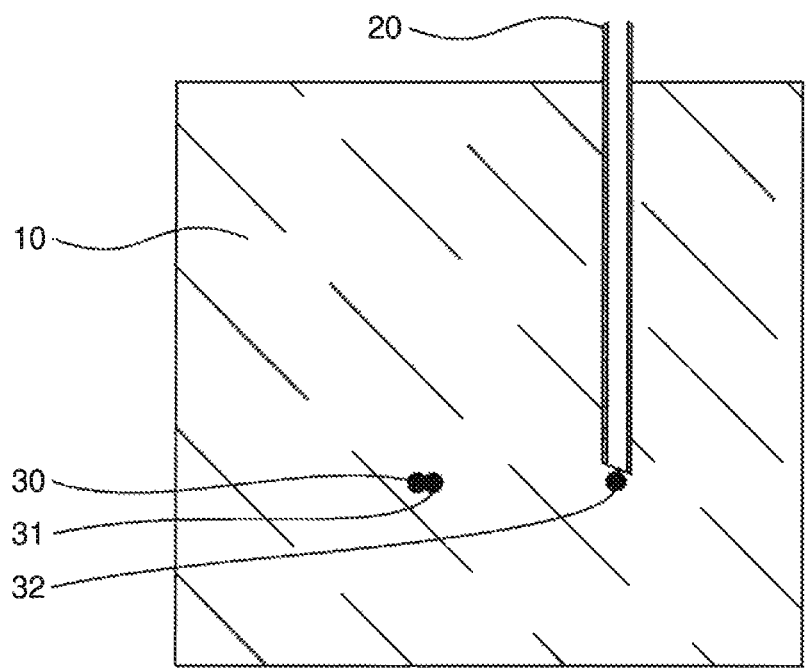
FIG. 4 shows a further step in the process according to the invention

Other options for performing step III) are shown in FIGS. 3 and 4. The situation according to FIG. 3 follows from the situation according to FIG. 2. After injection of the material 30 in FIG. 2 the cannula 20 was removed from the foam body 10 and reinserted at another location. Subsequently, further material 31 is injected at a further predetermined location which in this case is adjacent to the previously injected material 30.

The situation shown in FIG. 4 follows from the situation shown in FIG. 3. After injection of the material 31 the cannula 20 was removed from the foam body 10. The cannula 20 is subsequently introduced at a new location and material 32 is injected.

Figure 5:
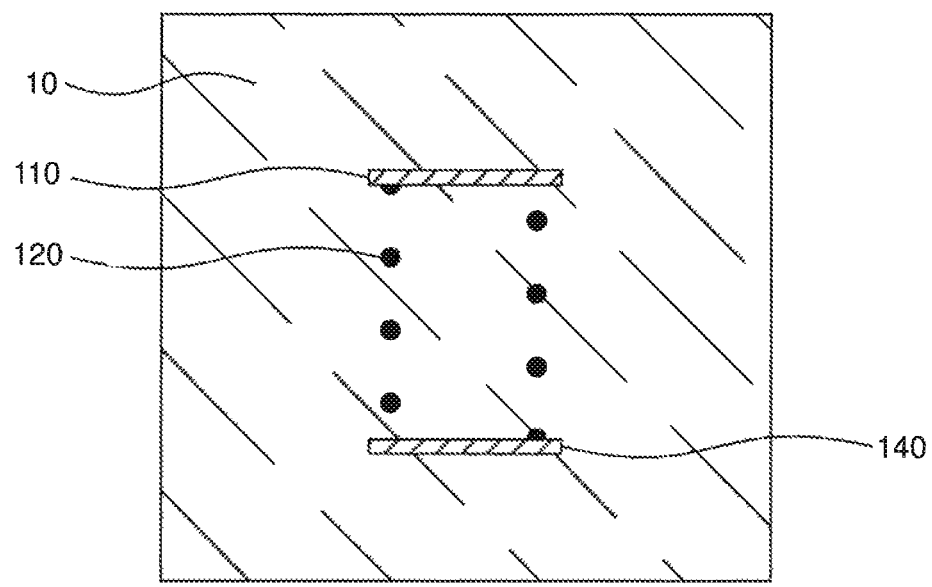

FIG. 5 shows a foam body having an internal structure as the final outcome of the process according to the invention in a cross sectional view. The spring 100 having a top plate 110 and a base plate 140 which was selected as the internal structure and is shown in FIG. 1 is embedded in the foam body 10. The foam of the foam body 10 penetrates the spring, i.e. the volume formed by the windings of the spring whose cross sectional areas are labeled with reference numeral 120 is not a cavity but rather is filled by foam. This is easy to implement via the process according to the invention since the internal structure is constructed in existing foam.

Figure 6:
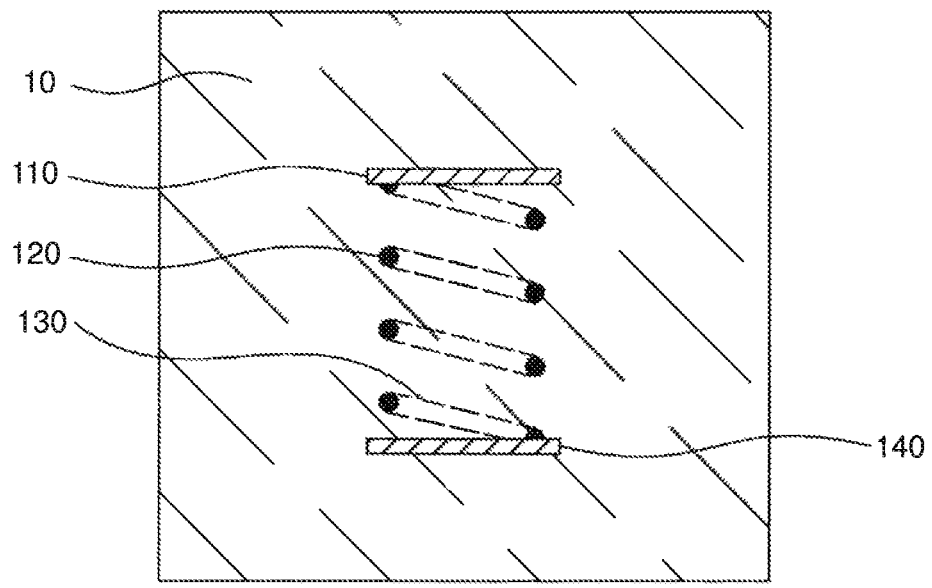

For better understanding FIG. 6 shows the same cross sectional view as FIG. 5 with the exception that therein the segments 130 of the spring present in the foam and disposed behind the sectional plane are shown with dashed lines.

In a preferred embodiment of the process the injected melts or the injected reaction mixtures at least partially join with one another to afford a common volume element in two consecutive steps III). This is shown in FIG. 3. The introduced material 30 and 31 combines to afford a common volume so that one-piece structures or structure sections may also be constructed. In the case of injection of a polymer melt the fact that the foam body 10 acts as a thermal insulation means may be utilized. This facilitates the coalescing of the polymer melt injected in the individual injection steps.

A foam body according to the invention shall be further elucidated with reference to FIGS. 1, 5 and 6. The foam body 10 having an internal structure 100 obtainable by a process according to the invention, wherein the internal structure 100 comprises a first polymeric material and the foam body 10 comprises a second polymeric material and the material of the internal structure 100 is distinct from the material of the foam body 10 has the initial feature that all surfaces of the internal structure 100 contact the foam body 10. This is to be understood as meaning in particular that there are no cavities between the structure 100 and the foam body 10, it being appreciated that this excludes cavities present in the foam itself. It is preferable when the contact is a positive contact so that mechanical forces may be more readily transferred between the foam body 10 and the structure 100.

It is further provided that the internal structure 100 is a spring having a loading direction. The loading direction of the spring is the direction upon which the design of the spring is based. Thus the spring shown in FIG. 1 is subjected to tensile or compressive load along the dotdashed line.

Upon loading of the foam body 10 at a location at which the internal structure 100 is present and upon loading along the loading direction of the internal structure the determined compressive strength (40% compression, DIN EN ISO 3386-1:2010-09) is ≥10% to ≤10 000% higher than the compressive strength (40% compression, DIN EN ISO 3386-1:2010-09) of the foam body 10 at a location at which no internal structure 100 is present.

The spring integrated into the foam body 10 thus brings about a local increase in compressive strength compared to regions of the foam body in which no spring is integrated and only the foam of the foam body thus determines compressive strength. The compressive strength is preferably ≥20% to ≤80% higher, more preferably ≥30% to ≤70%.

The presence of the internal structure 100 in the foam body 10 may have a synergistic effect in terms of local compressive strength when the deformation of the foam is influenced by the internal structure 100 and the deformation of the structure 100 is influenced by the foam. In the simplest case, as shown in FIGS. 5 and 6, the foam present between the segments 130 of the spring can have the effect that the spring already achieves its maximum possible compression at a lower compression travel.

FIG. 7 to FIG. 23b show examples of foam bodies according to the invention in which the internal structure is a plurality of non-interconnected spherical or rod-shaped volumes or a plurality of interconnected spherical or rod-shaped volumes.

FIG. 7 shows a foam body 10 having internal structures in the form of non-interconnected spherical volumes 200. The material of the foam body 10 may comprise a polyurethane foam for example and the material of the volumes 200 a thermosetting or elastomeric polyurethane or epoxy resin for example. Volumes 200 present in the foam body 10 shown here are positioned in a plane just below the surface of the foam body 10 so that an aesthetic or functional influencing of the surface may be achieved.

FIGS. 8a and 8b show foam bodies 10 having internal structures in the form of non-interconnected spherical volumes 200. The material of the foam bodies 10 may comprise a polyurethane foam for example and the material of the volumes 200 a thermosetting or elastomeric polyurethane or epoxy resin for example. Volumes 200 present in the foam bodies 10 shown here are positioned in the volume of the foam bodies 10 randomly (FIG. 8a) or in a cubic grid (FIG. 8b). One application for foam bodies 10 functionalized in such a way is in acoustic absorbtion elements.

Figure 9:
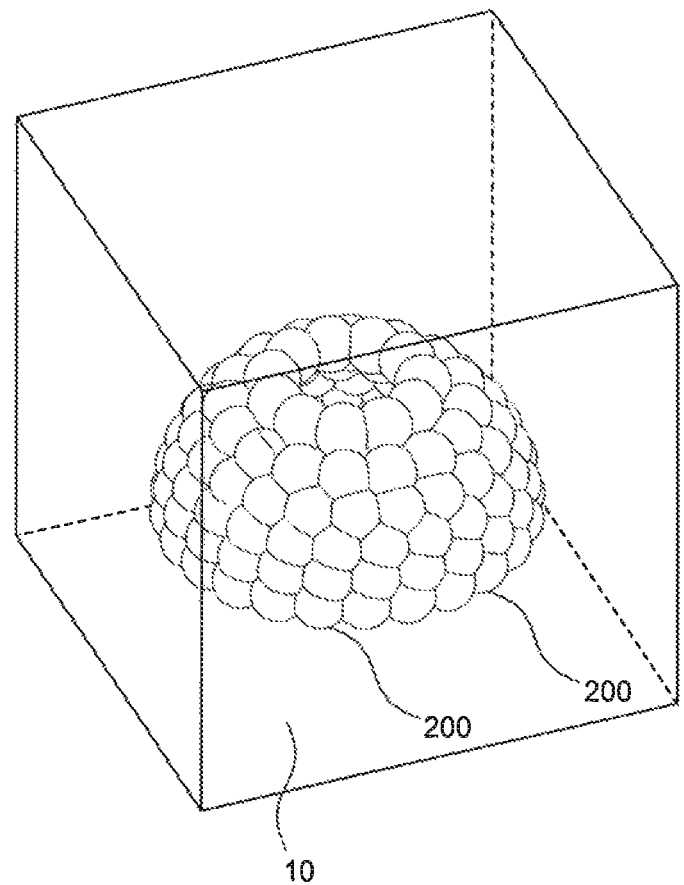

FIG. 9 shows a foam body 10 having an internal structure in the form of interconnected nominally spherical volumes 200. The material of the foam body 10 may comprise a polyurethane foam for example and the material of the volumes 200 a thermosetting or elastomeric polyurethane or epoxy resin for example. Volumes 200 present in the foam body 10 shown here form a section of a spherical bowl. One application for foam bodies 10 functionalized in such a way is in seat cushions having a compressive strength adjustable via the material and the shape of the connected volumes 200.

Figure 10A:
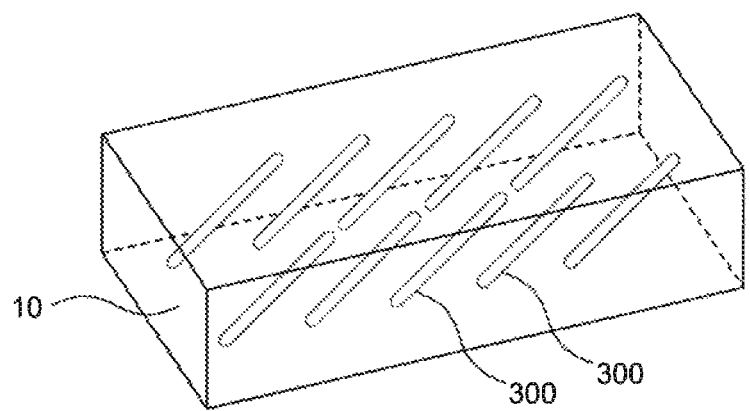
Figure 10B:
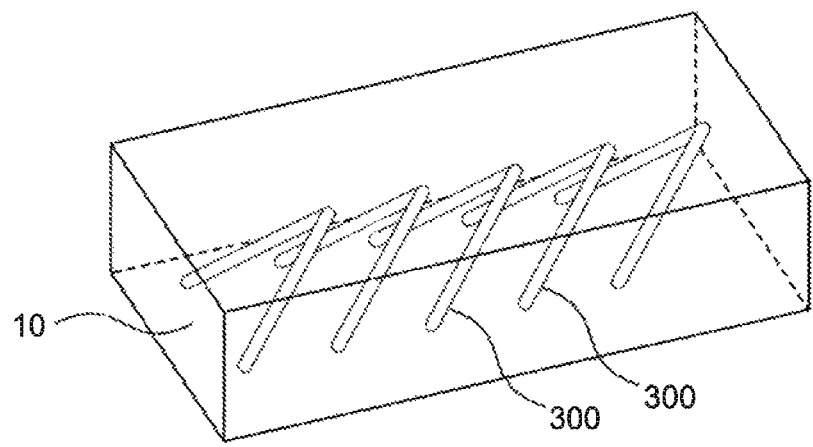
Figure 10C:
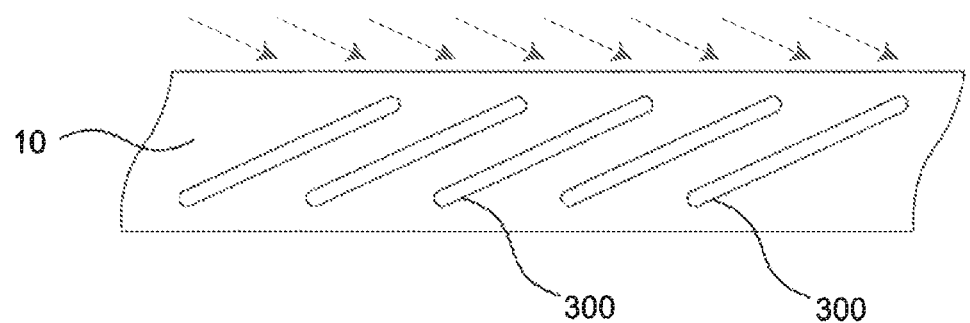
Figure 10D:
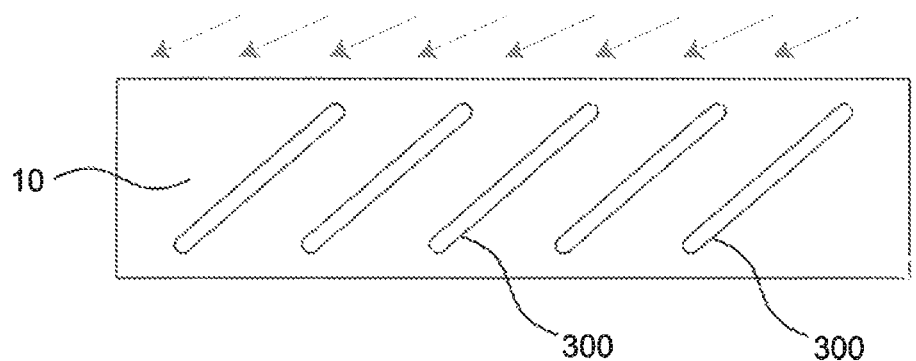

FIGS. 10a and 10b show foam bodies 10 having internal structures in the form of rod-shaped volumes 300 which are linear (FIG. 10a) or angled in a V-shape (FIG. 10b). The material of the foam bodies 10 may comprise a polyurethane foam for example and the material of the volumes 300 a thermosetting or elastomeric polyurethane or epoxy resin for example. In their longitudinal direction the volumes 300 extend in a direction which is not parallel with but rather at an angle to a lateral surface of the foam body 10. The angle may be 40° to 50° for example. In their longitudinal direction said volumes in particular do not extend perpendicularly to the surface which is or would be in contact with a person sitting on the foam bodies 10. This makes it possible to achieve different deformation behaviors with respect to the shear forces applied to this surface. This is shown in the cross sectional views of FIG. 10c and FIG. 10d. The shear load applied in FIG. 10c can push the volumes 300 away and thus also compress the foam body 10. By contrast, in FIG. 10d the shear load cannot achieve this and the foam body is therefore not compressed or compressed to a lesser extent than is shown in FIG. 10c. One application for foam bodies functionalized in such a way is in seat cushions.

Figure 11A:
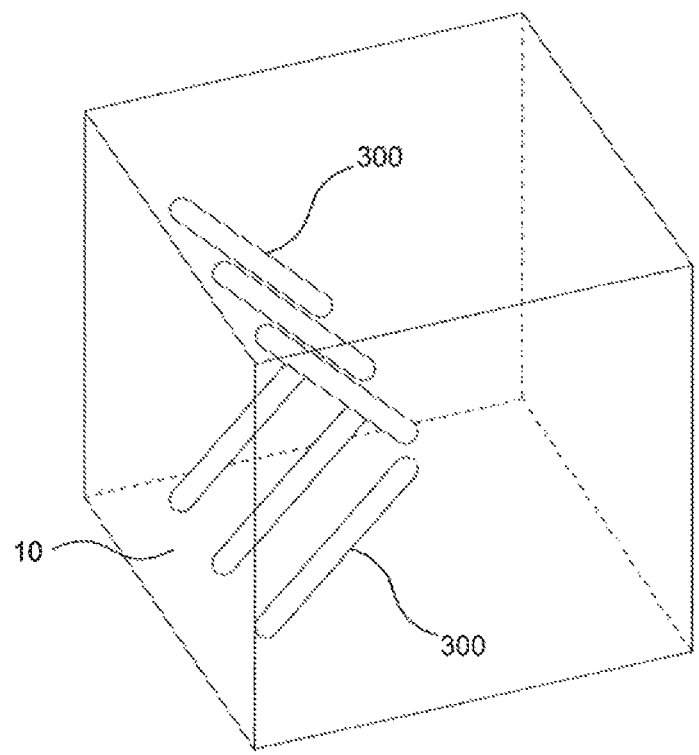
Figure 11B:
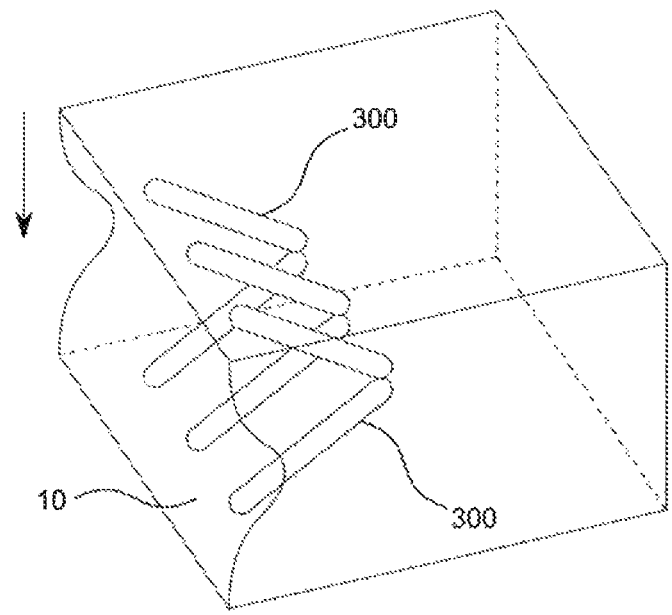

FIGS. 11a and 11b show foam bodies 10 having internal structures in the form of rod-shaped volumes 300 that are non-interconnected but arranged pairwise in a V-shape with respect to one another. The material of the foam bodies 10 may comprise a polyurethane foam for example and the material of the volumes 300 a thermosetting or elastomeric polyurethane or epoxy resin for example. The angle in the pairs arranged in a V-shape may be 40° to 50° for example. Furthermore, the opening of the pairs arranged in a V-shape points in the direction of a lateral surface of the foam body 10. This makes it possible to achieve a specific deformation behavior of the foam body as shown in FIG. 11b. Upon loading, for example by a person sitting on the foam body 10, the foam body 10 is compressed on this side according to the arrangement of the V-shaped pairs. The same effect is also achievable when the volumes 300 are in the form of respective continuous angled volumes. One application for foam bodies functionalized in such a way is in seat cushions.

Figure 12A:
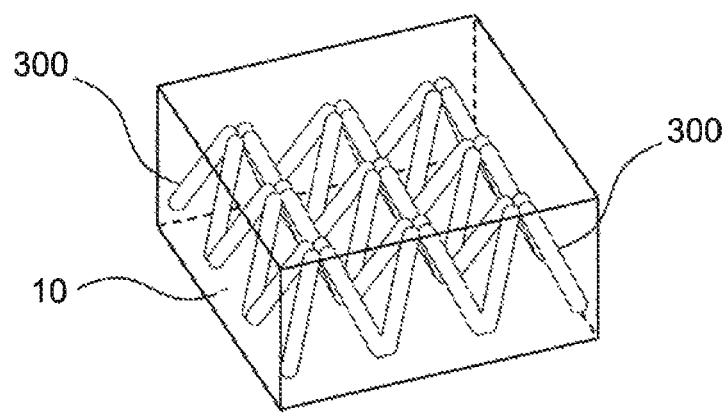
Figure 12B:
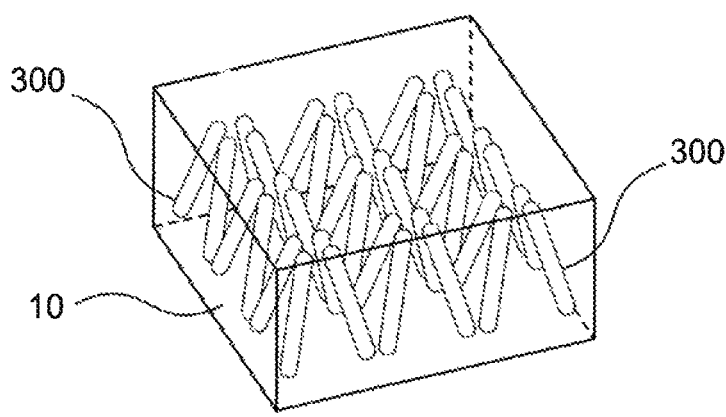
Figure 12C:
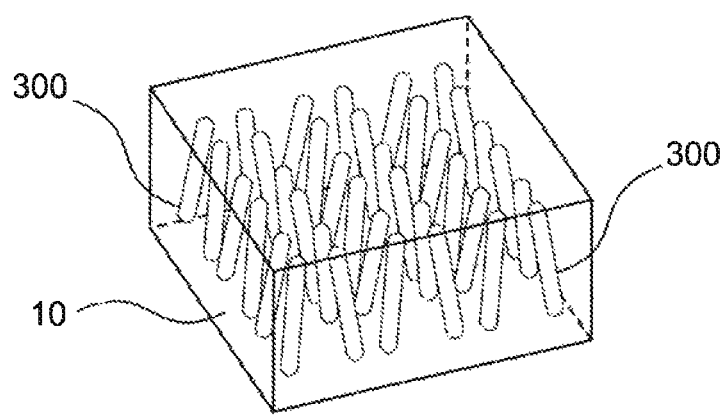

FIG. 12a to FIG. 12c show foam bodies 10 having internal structures in the form of rod-shaped volumes 300 which are non-interconnected but each form the edges of a pyramid or a truncated pyramid. The pyramids or truncated pyramids may have a triangular, square or pentagonal base for example. The material of the foam bodies 10 may comprise a polyurethane foam for example and the material of the volumes 300 a thermosetting or elastomeric polyurethane or epoxy resin for example. The angle between adjacent pairs of the volumes 300 arranged in a V-shape may be 5° to 85°, preferably 15° to 60°, for example. Furthermore, the tip of the pyramids or vuncated pyramids points in the direction of the surface which is or would be in contact with a person sitting on the foam bodies 10. This makes it possible to achieve a specific deformation behavior of the foam body 10: the greater the angle, the more easily the foam body 10 is deformed under load. One application for foam bodies functionalized in such a way is in seat cushions.

Figure 13A:
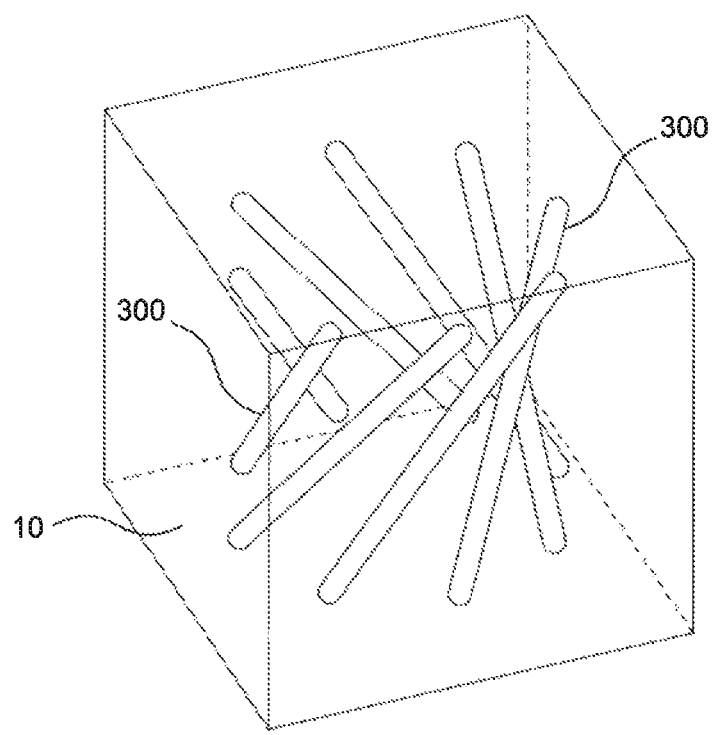
Figure 13B:
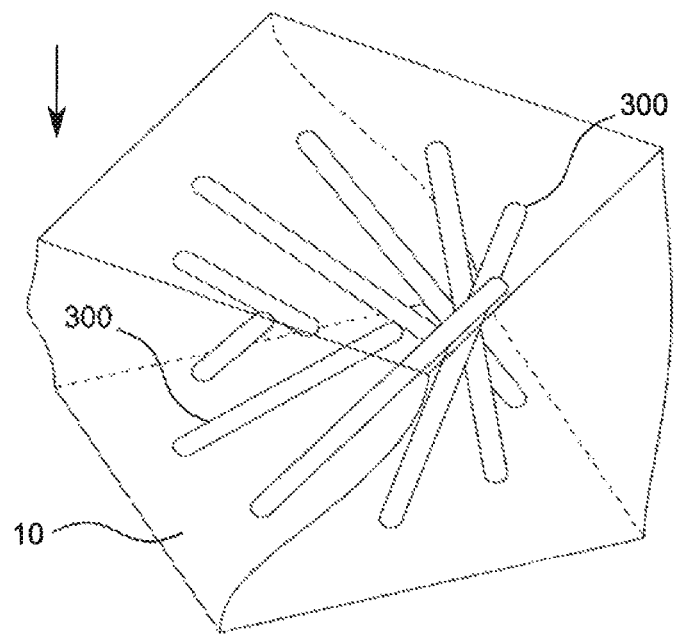

FIGS. 13a and 13b show foam bodies 10 having internal structures in the form of rod-shaped volume elements 300 arranged on the lateral surface of a notional truncated double cone. The material of the foam bodies 10 may comprise a polyurethane foam for example and the material of the volumes 300 a thermosetting or elastomeric polyurethane or epoxy resin for example. The inclination angle of the volumes 300 may be 15° to 60° for example. Furthermore, one base of the truncated double cones points in the direction of the surface which is or would be in contact with a person sitting on the foam bodies 10. This makes it possible to achieve a specific deformation behavior of the foam body 10: compressive load causes the foam body 10 to twist as shown in FIG. 13b. One application for foam bodies functionalized in such a way is in seat cushions.

Figure 14A:
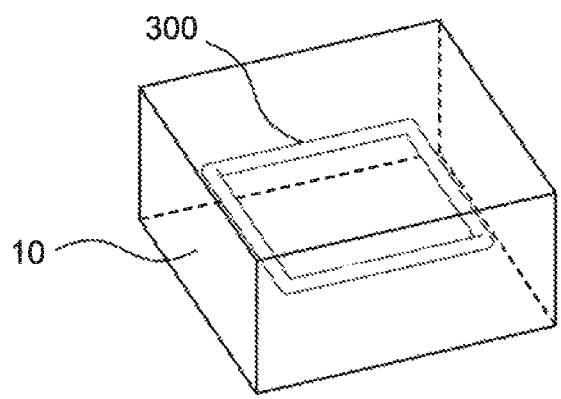
Figure 14B:
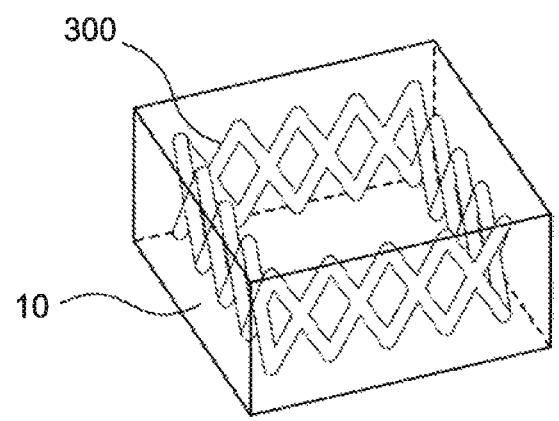
Figure 14C:
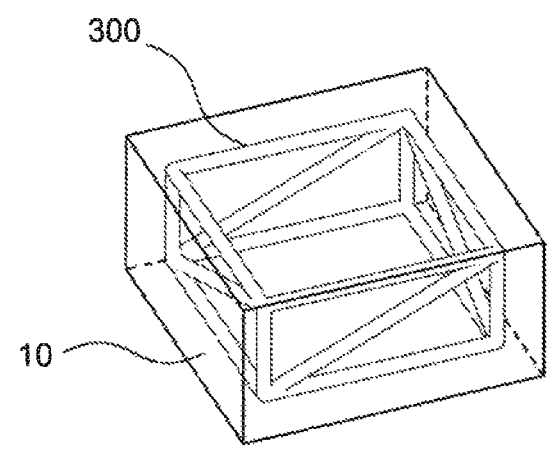
Figure 14D:
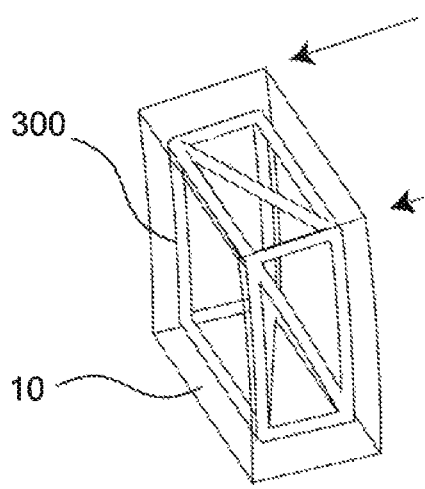
Figure 14E:
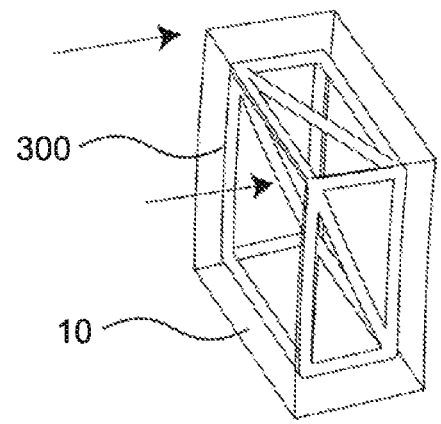

FIG. 14a to FIG. 14c show foam bodies 10 in which internal structures made of rod-shaped volume elements 300 serve as frames for reinforcing the sides of foam bodies 10. The material of the foam bodies 10 may comprise a polyurethane foam for example and the material of the volumes 300 a thermosetting or elastomeric polyurethane or epoxy resin for example. In the arrangement shown in FIG. 14a the rod-shaped volume elements 300 are connected to form a rectangular frame. The frame according to FIG. 14b is constructed from rod-shaped volume elements 300, four of which converge at each branching point. A doubled-up version of the frame from FIG. 14a is shown in FIG. 14c. The frames are likewise interconnected via diagonal struts. The reinforcing of the foam body 10 from FIG. 14c against a bending load is shown schematically in FIG. 14d and FIG. 14e. One application for foam bodies functionalized in such a way is in seat cushions.

Figure 15:
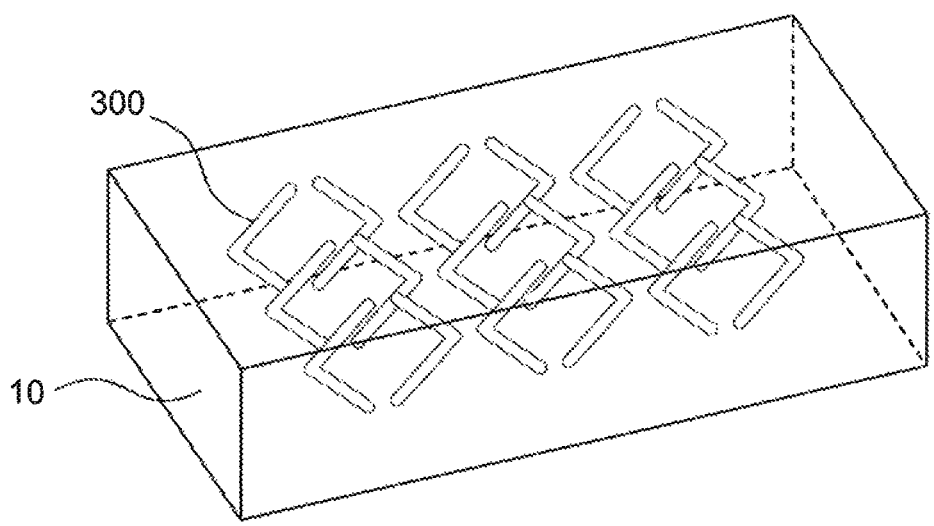

FIG. 15 shows a foam body 10 having internal structures in the form of rod-shaped volumes 300 angled in a V-shape. The material of the foam body 10 may comprise a polyurethane foam for example and the material of the volumes 300 a thermosetting or elastomeric polyurethane or epoxy resin for example. The angle may be 40° to 50° for example. The bisectrix extends parallel to the surface which is or would be in contact with a person sitting on the foam bodies 10.

Furthermore, the plane spanning the rod-shaped volumes 300 angled in a V-shape extends perpendicularly to the surface which is or would be in contact with a person sitting on the foam bodies 10. One application for foam bodies functionalized in such a way is in seat cushions.

Figure 16A:
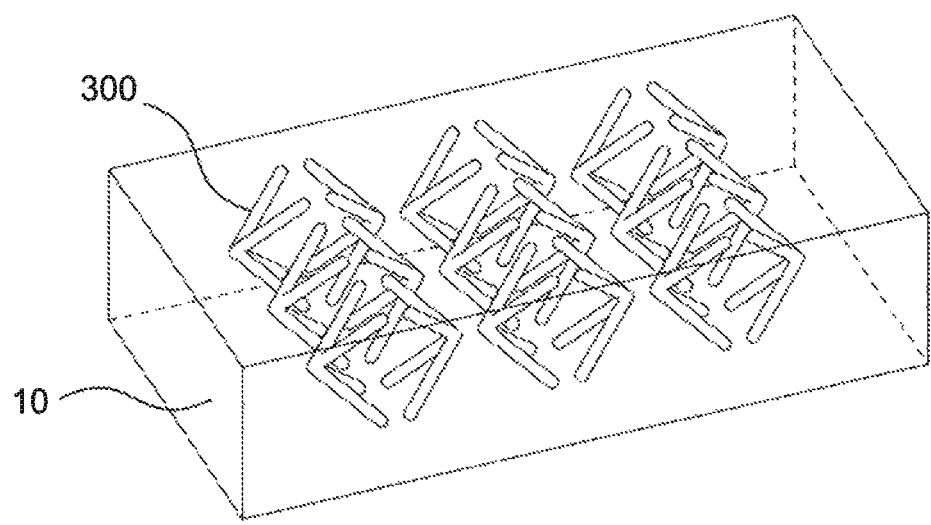
Figure 16B:
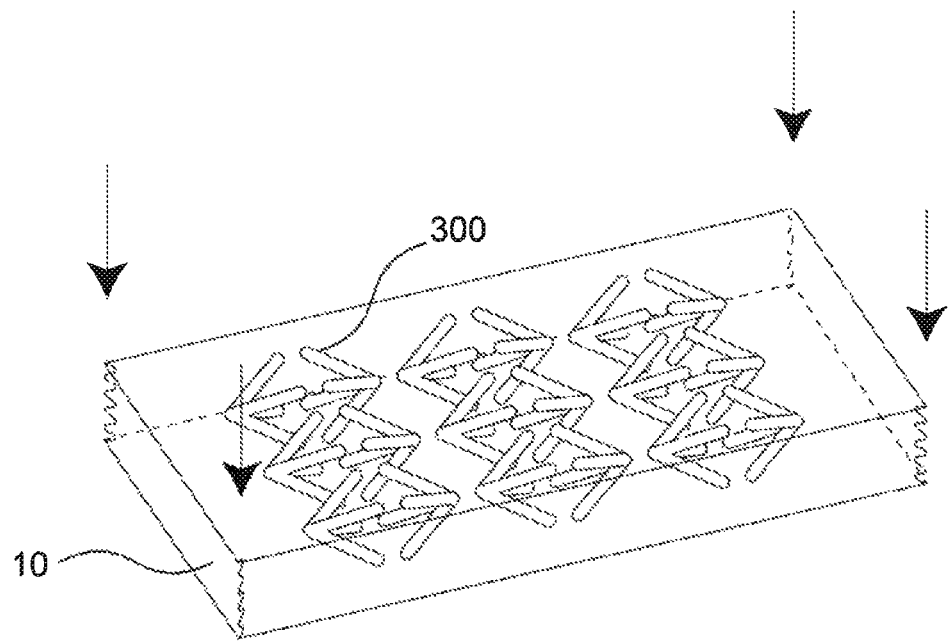

The corner of the volumes angled in a V-shape may also be considered to be a node point when more than two rod-shaped volumes emanate therefrom. Such an arrangement is shown in FIG. 16*a* (unloaded state) and FIG. 16*b* (loaded state). The material of the foam bodies 10 may comprise a polyurethane foam for example and the material of the volumes 300 a thermosetting or elastomeric polyurethane or epoxy resin for example. The angle enclosed by two adjacent rod-shaped volumes 300 may be 40° to 50° for example. In the foam body 10 the stiffness of the body, for example during sitting thereupon, may be adjusted via the number of rod-shaped volumes 300 emanating from one node point. The more rod-shaped volumes converge at one node point, the stiffer the body in the loading direction. One application for foam bodies functionalized in such a way is in seat cushions.

Figure 17:
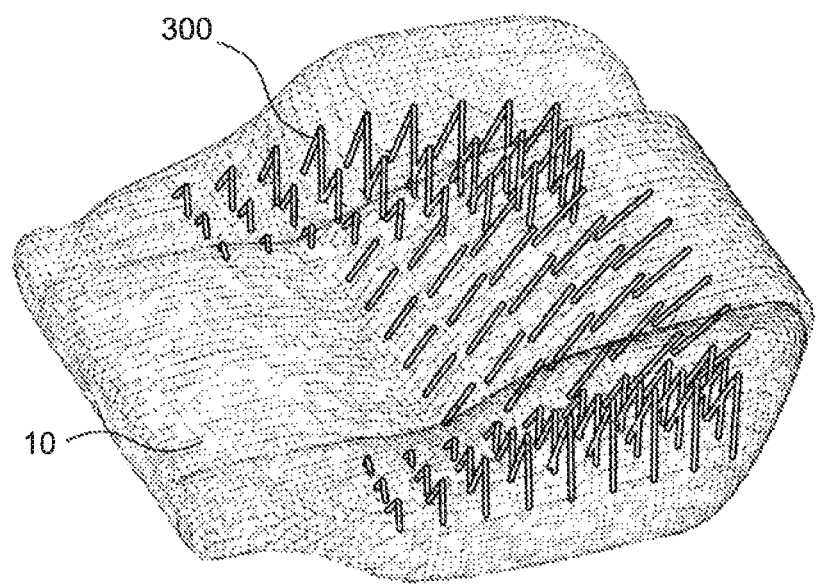

FIG. 17 shows a seat cushion such as may be employed as a seat base in a vehicle seat. The foam body 10 contains rod-shaped volume elements 300 angled in a V-shape in the side bolsters and linear rod-shaped volume elements in the base section. The material of the foam body 10 may comprise a polyurethane foam for example and the material of the volumes 300 a thermosetting or elastomeric polyurethane or epoxy resin for example. The linear rod-shaped volume elements act as previously elucidated in connection with FIG. 10*a*/10*c*/10*d*. The height of the volume elements 300 angled in a V-shape in the side bolsters increases with increasing spacing outward so that a deformation propensity gradient is achieved. The principle of the deformation of the side bolsters under the influence of the volume elements 300 angled in a V-shape corresponds substantially to the intimations concerning FIG. 11*a*/*b* and FIG. 15.

Figure 18:
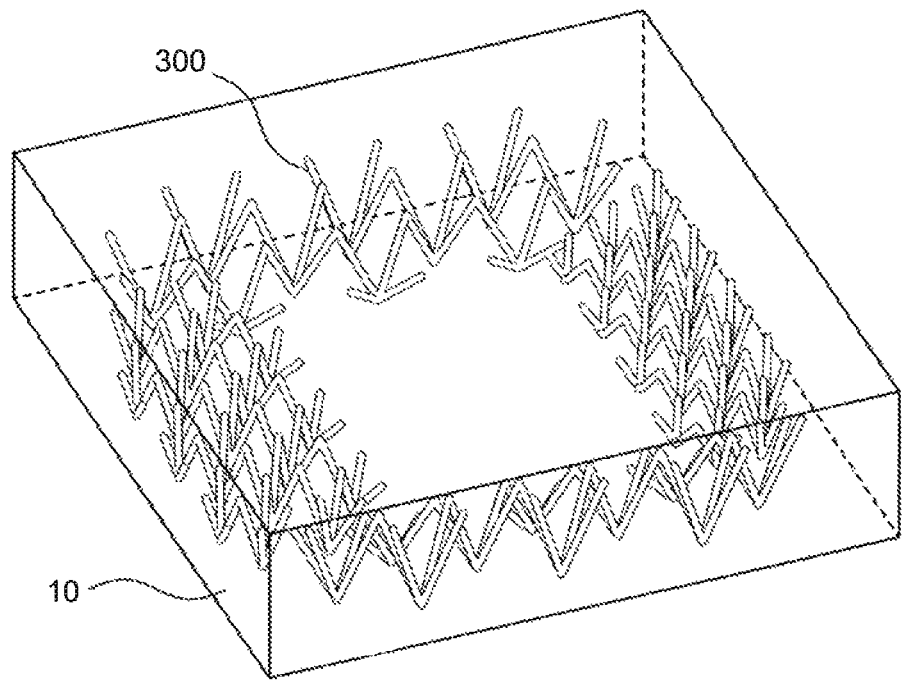

FIG. 18 shows a foam body 10 having internal structures in the form of mad-shaped volumes 300 which are interconnected and each form the edges of a pyramid. The pyramids may have a triangular, square or pentagonal base for example. The material of the foam body 10 may comprise a polyurethane foam for example and the material of the volumes 300 a thermosetting or elastomeric polyurethane or epoxy resin for example. The angle between adjacent pairs of the volumes 300 arranged in a V-shape may be 5° to 85°, preferably 15° to 60°, for example. Furthermore, the base of the pyramids points in the direction of the surface which is or would be in contact with a person sitting on the foam bodies 10. The length of the angled volume elements 300 increases with increasing distance from the center of the foam body so that a gradient of deformation propensity is achieved. One application for foam bodies functionalized in such a way is in seat cushions.

Figure 19:
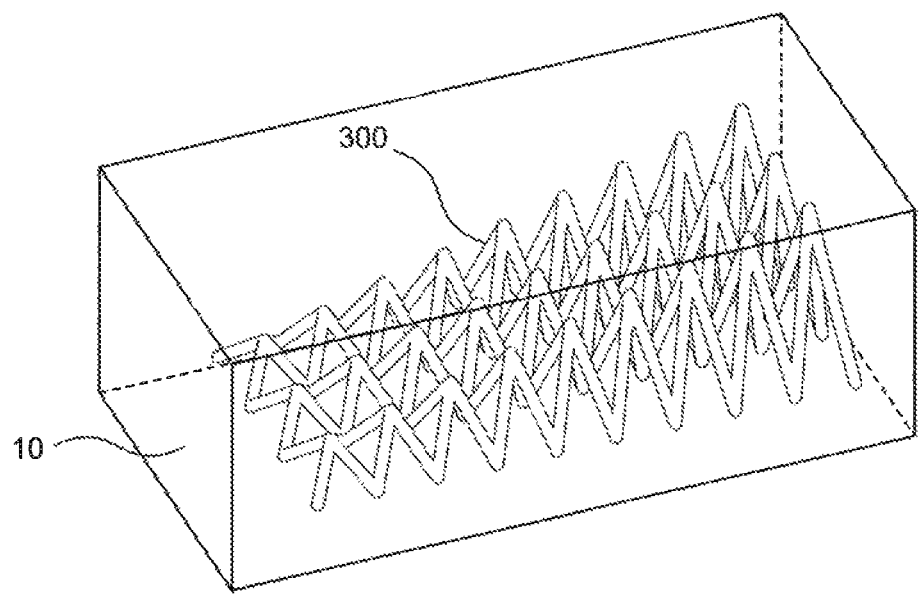
Figure 20:
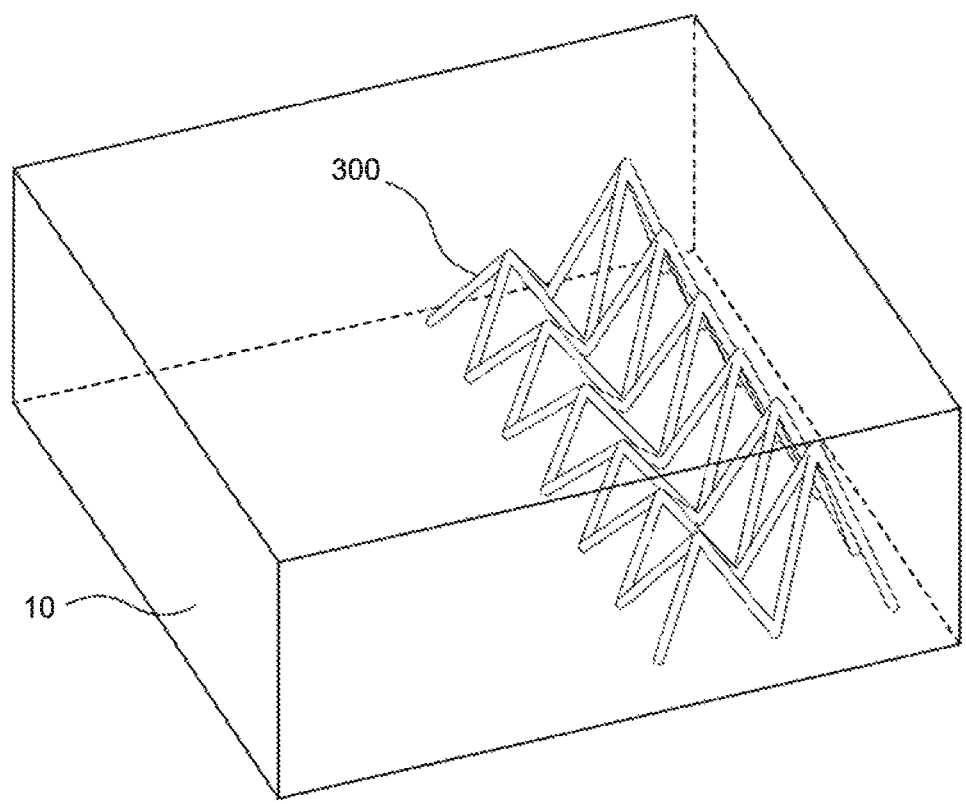

The same principle of the varying edge length of the pyramids in combination with a variation in the edge angle of the pyramids to influence the deformation of the foam body is also implemented in the foam bodies 10 shown in FIG. 19 and FIG. 20. Shown in each case is a foam body 10 having internal structures in the form of rod-shaped volumes 300 which are interconnected and each form the edges of a pyramid. The pyramids may have a triangular, square or pentagonal base for example. The material of the foam bodies 10 may comprise a polyurethane foam for example and the material of the volumes 300 a thermosetting or elastomeric polyurethane or epoxy resin for example. The angle between adjacent pairs of the volumes 300 arranged in a V-shape may be 5° to 85°, preferably 15° to 60°, for example. One application for foam bodies functionalized in such a way is in seat cushions.

Figure 21:
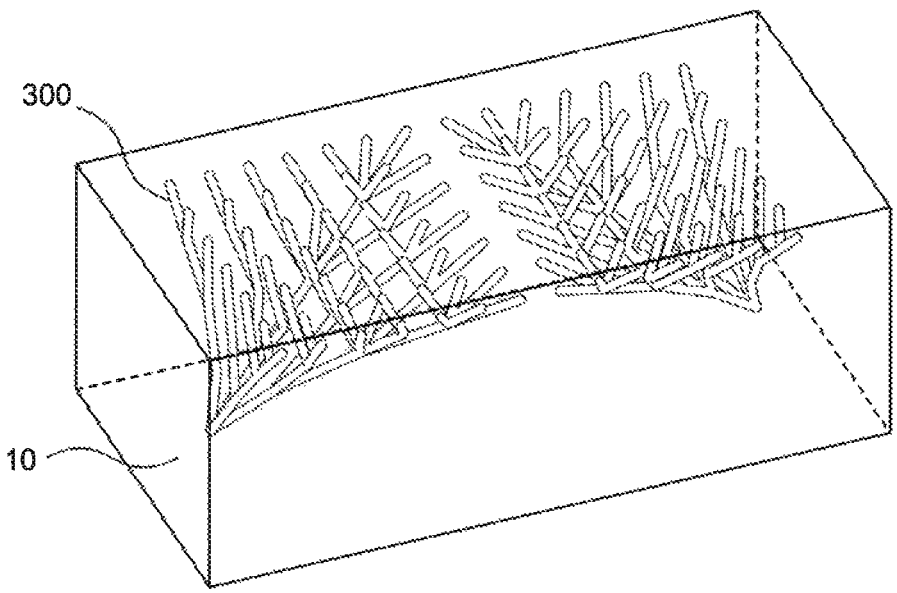

FIG. 21 shows a foam body 10 having internal structures in the form of interconnected rod-shaped volumes 300. The interconnection of the rod shaped volumes 300 may be described as a tree structure. Binary, ternary and quaternary tree structures are inter alia conceivable. The material of the foam body 10 may comprise a polyurethane foam for example and the material of the volumes 300 a thermosetting or elastomeric polyurethane or epoxy resin for example. The root of the tree structures preferably faces away from the surface which is or would be in contact with a person sitting on the foam bodies 10. This makes it possible for branches of the tree structures to absorb stresses and pass these in the direction of their roots in a controlled manner. One application for foam bodies functionalized in such a way is in seat cushions.

Figure 22A:
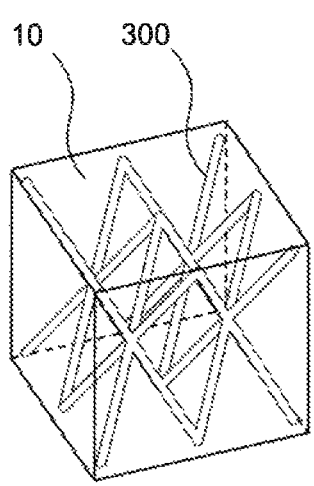
Figure 22B:
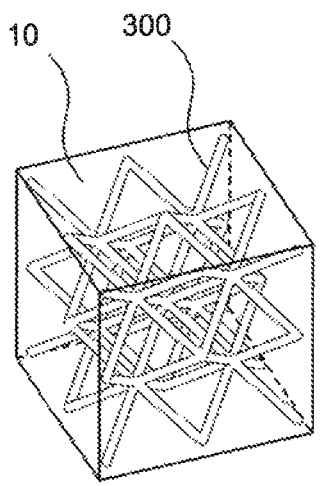
Figure 22C:
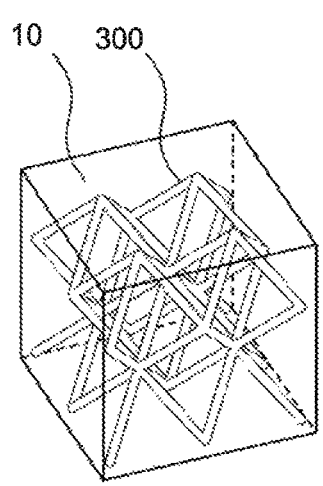

The compression behavior of the foam bodies is likewise controllable via the spatial density of node points. FIG. 22*a* to FIG. 22*c* show foam bodies 10 having ever increasing densities of node points so that the applied force required for compression is ever increasing. The material of the foam bodies 10 may comprise a polyurethane foam for example and the material of the interconnected rod-shaped volumes 300 a thermosetting or elastomeric polyurethane or epoxy resin for example. One application for foam bodies functionalized in such a way is in seat cushions.

Figure 23A:
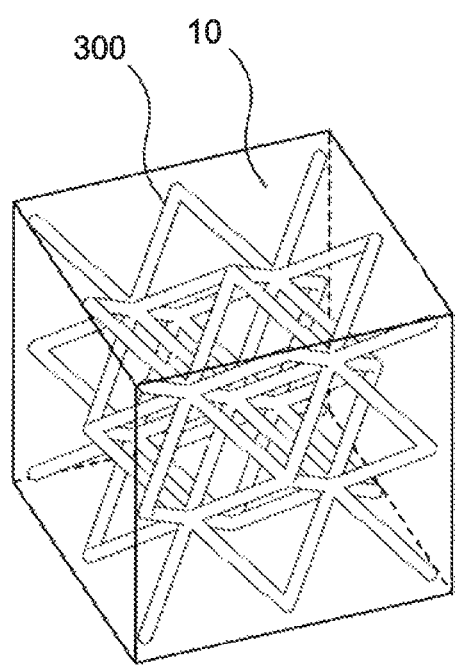
Figure 23B:
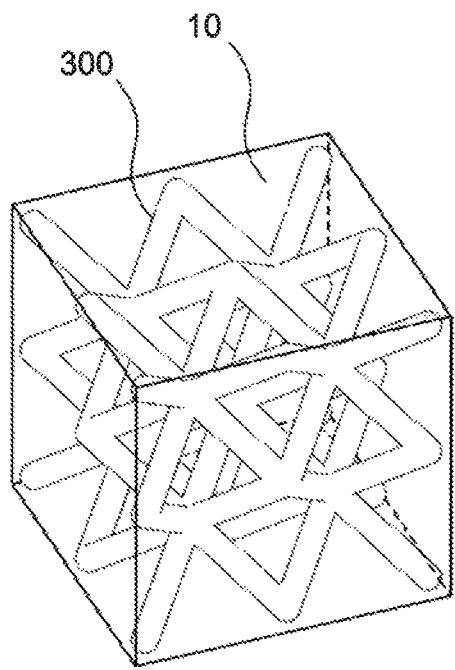

Similarly to this the compression behavior is also controllable via the thickness of the interconnected rod-shaped volumes 300 as shown in FIG. 23*a* and FIG. 23*b*. These figures show foam bodies 10 in which while maintaining the same spatial density of node points the thickness of the interconnected rod-shaped volumes 300 is different so that the applied force required for compression is ever increasing. The material of the foam bodies 10 may comprise a polyurethane foam for example and the material of the interconnected rod-shaped volumes 300 a thermosetting or elastomeric polyurethane or epoxy resin for example. One application for foam bodies functionalized in such a way is in seat cushions.

The invention claimed is:

1. A process for producing a foam body having an internal structure, comprising the steps of:
    I) selecting an internal structure to be formed in the foam body, wherein the structure comprises a first polymeric material;
    II) providing a foam body, wherein the foam body comprises a second polymeric material distinct from the first polymeric material;
    III) introducing an injection means at a predetermined location inside the foam body and injecting via the injection means a predetermined amount of a melt of the first polymeric material or a predetermined amount of a reaction mixture that reacts to afford the first polymeric material at the predetermined location, wherein the predetermined amount corresponds to a volume element of the internal structure, and wherein injecting the predetermined amount destroys and/or displaces a portion of the foam body at the predetermined location;
    IV) repeating step III) for further predetermined locations inside the foam body corresponding to further volume elements of the internal structure until the internal structure is formed.

2. The process as claimed in claim 1, wherein the injected melts or the injected reaction mixtures become at least partially interconnected to afford a common volume element in two consecutive steps III).

3. The process as claimed in claim 1, comprising a plurality of different first polymeric materials.

4. The process as claimed in claim 1, wherein a plurality of injection means differing in their mechanical construction are employed.

5. The process as claimed in claim 1, wherein the foam body comprises a flexible foam having a compressive strength (40% compression, DIN EN ISO 3386-1:2010-09) of $\geq 10$ to $\leq 100$ kPa and a density (DIN EN ISO 845) of $\geq 10$ kg/m$^3$ to $\leq 100$ kg/m$^3$.

6. The process as claimed in claim 1, wherein the second polymeric material is a polyurethane polymer.

7. The process as claimed in claim 1, wherein the internal structure selected in step I) is adapted to alter the deformation behavior of the foam body under tensile load, compressive load and/or shear load such that upon deformation under the load a volume element of the foam body which encompasses the internal structure undergoes a change to a volume of 10% relative to the volume of a volume element of the foam body which comprises no internal structure.

8. The process as claimed in claim 1, wherein the internal structure selected in step I) is a leaf spring, spiral spring, elliptical spring, parabolic spring, wave spring, leg spring, rod spring, coil spring, disk spring, a thread or a socket for bayonet mounts.

9. The process as claimed in claim 1, wherein the internal structure selected in step I) is a plurality of non-interconnected spherical, elliptical or rod-shaped volumes or a plurality of interconnected spherical, elliptical or rod-shaped volumes.

10. The process as claimed in claim 1, wherein the first polymeric material is a polyurethane polymer.

11. The process as claimed in claim 1, wherein a plurality of steps III) are performed simultaneously.

12. The process as claimed in claim 1, wherein the predetermined amount in step III) has a volume of $\geq 10$ µL to $\leq 1000$ mL.

13. The process as claimed in claim 1, wherein the injection means in step III) is a cannula, the end of the cannula is moved to the predetermined location of the foam body for injection of the predetermined amount and the movement of the end of the cannula is performed such that first polymeric material already present in the foam body is not contacted by the cannula.

14. The process as claimed in claim 1, wherein formation of the internal structure is followed by performance of a material-removing after treatment step on the foam body having the internal structure.

* * * * *